United States Patent
Hwang et al.

(10) Patent No.: US 9,099,157 B1
(45) Date of Patent: *Aug. 4, 2015

(54) SYSTEMS AND METHODS FOR ADJACENT TRACK INTERFERENCE BASED RE-WRITING

(71) Applicant: LSI Corporation, San Jose, CA (US)

(72) Inventors: Eui Seok Hwang, Palo Alto, CA (US); Shaohua Yang, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/268,741

(22) Filed: May 2, 2014

Related U.S. Application Data

(60) Provisional application No. 61/982,793, filed on Apr. 22, 2014.

(51) Int. Cl.
| | | |
|---|---|---|
| *G11B 27/36* | (2006.01) | |
| *G11B 20/10* | (2006.01) | |
| *G11B 20/18* | (2006.01) | |

(52) U.S. Cl.
CPC .... *G11B 20/10388* (2013.01); *G11B 20/10453* (2013.01); *G11B 20/1816* (2013.01); *G11B 27/36* (2013.01)

(58) Field of Classification Search
None
See application file for complete search history.

(56) References Cited

U.S. PATENT DOCUMENTS

| | | | |
|---|---|---|---|
| 6,947,234 B2 * | 9/2005 | Lamberts et al. | 360/53 |
| 7,729,071 B2 | 6/2010 | Harada | |
| 7,733,592 B2 | 6/2010 | Hutchins et al. | |
| 7,982,994 B1 | 7/2011 | Erden et al. | |
| 8,250,434 B2 | 8/2012 | Yang et al. | |
| 8,537,482 B1 | 9/2013 | Song et al. | |
| 8,638,513 B1 | 1/2014 | Burd | |
| 2008/0151704 A1 | 6/2008 | Harada | |
| 2009/0135693 A1 | 5/2009 | Kim | |
| 2011/0041028 A1 | 2/2011 | Liu et al. | |
| 2011/0103527 A1 | 5/2011 | Liu et al. | |
| 2012/0063022 A1 | 3/2012 | Mathew | |
| 2012/0063023 A1 | 3/2012 | Mathew et al. | |
| 2012/0063024 A1 | 3/2012 | Mathew | |
| 2012/0063284 A1 | 3/2012 | Mathew et al. | |
| 2013/0021689 A1 | 1/2013 | Haratsch | |
| 2013/0083418 A1 | 4/2013 | Worrell et al. | |
| 2013/0275829 A1 | 10/2013 | Sridhara et al. | |
| 2013/0286498 A1 | 10/2013 | Haratsch et al. | |

OTHER PUBLICATIONS

U.S. Appl. No. 14/148,306, filed Jan. 6, 2014, Pan, Lu.

(Continued)

*Primary Examiner* — K. Wong
(74) *Attorney, Agent, or Firm* — Hamilton DeSanctis & Cha

(57) ABSTRACT

Systems and method relating generally to data processing, and more particularly to systems and methods for confirming data validity. In one case, a system is disclosed that includes an adjacent track interference confirmation circuit. The adjacent track interference confirmation circuit is operable to receive an indication of an adjacent track interference; determine a causal connection between the adjacent track interference and a mis-alignment of a read head and a track on a storage medium from which a data set corresponding to the indication of the adjacent track interference is derived; and provide a re-write signal where even after reduction of the mis-alignment the indication of adjacent track interference repeats.

20 Claims, 9 Drawing Sheets

(56) References Cited

OTHER PUBLICATIONS

U.S. Appl. No. 13/963,589, filed Aug. 9, 2013, Hwang, Eui Seok.
Gibson et al "Directions for Shingled-Write and Two-Dimensional Magnetic Recording System" Architectures: Synergies with Solid-State Disks Carnegie Mellon Univ. May 1, 2009.
U.S. Appl. No. 14/148,407, Unpublished, filed Jan. 6, 2014 (Lu Lu).
U.S. Appl. No. 14/109,804, Unpublished, filed Dec. 17, 2013 (Haitao Xia).
U.S. Appl. No. 14/217,886, Unpublished, filed Mar. 18, 2014 (Xiufeng Song).
U.S. Appl. No. 13/705,116, Unpublished, filed Dec. 4, 2012 (George Mathew).
U.S. Appl. No. 13/912,063, Unpublished, filed Jun. 6, 2013 (Fan Zhang).
U.S. Appl. No. 13/784,448, Unpublished, filed Mar. 4, 2013 (Jun Xiao).
U.S. Appl. No. 13/618,317, Unpublished, filed Sep. 14, 2012 (Jun Xiao).
Wu, et al., "Equation Based LDPC Decoder for Intersymbol Interference Channels" 2005 IEEE International Conf. on Acoustics, Speech, and Signal Processing vol. 5 Mar. 2005.

\* cited by examiner

SYSTEMS AND METHODS FOR ADJACENT TRACK INTERFERENCE BASED RE-WRITING

CROSS REFERENCE TO RELATED APPLICATIONS

The present application claims priority to (is a non-provisional of) U.S. Pat. App. No. 61/982,793 entitled "Systems and Methods for Adjacent Track Interference Based Re-Writing", and filed Apr. 22, 2014 by Hwang et al. The entirety of the aforementioned provisional patent application is incorporated herein by reference for all purposes.

FIELD OF THE INVENTION

Systems and methods relating generally to data processing, and more particularly to refreshing data stored to a storage medium.

BACKGROUND

A storage medium may include a number of tracks written with data. Writing data to one track results in a degradation of the data on an adjacent track. As different tracks are written at a different frequency, one track may be written a number of times before the adjacent track is re-written. In such a case, the degradation to the adjacent track increases and at some point results in a lack of readability of the adjacent track.

Hence, for at least the aforementioned reasons, there exists a need in the art for advanced systems and methods for storing data to a storage medium.

SUMMARY

Systems and methods relating generally to data processing, and more particularly to refreshing data stored to a storage medium.

Some embodiments of the present invention provide data processing systems that include an adjacent track interference confirmation circuit. The adjacent track interference confirmation circuit is operable to receive an indication of an adjacent track interference; determine a causal connection between the adjacent track interference and a mis-alignment of a read head and a track on a storage medium from which a data set corresponding to the indication of the adjacent track interference is derived; and provide a re-write signal where even after reduction of the mis-alignment the indication of adjacent track interference repeats.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1:
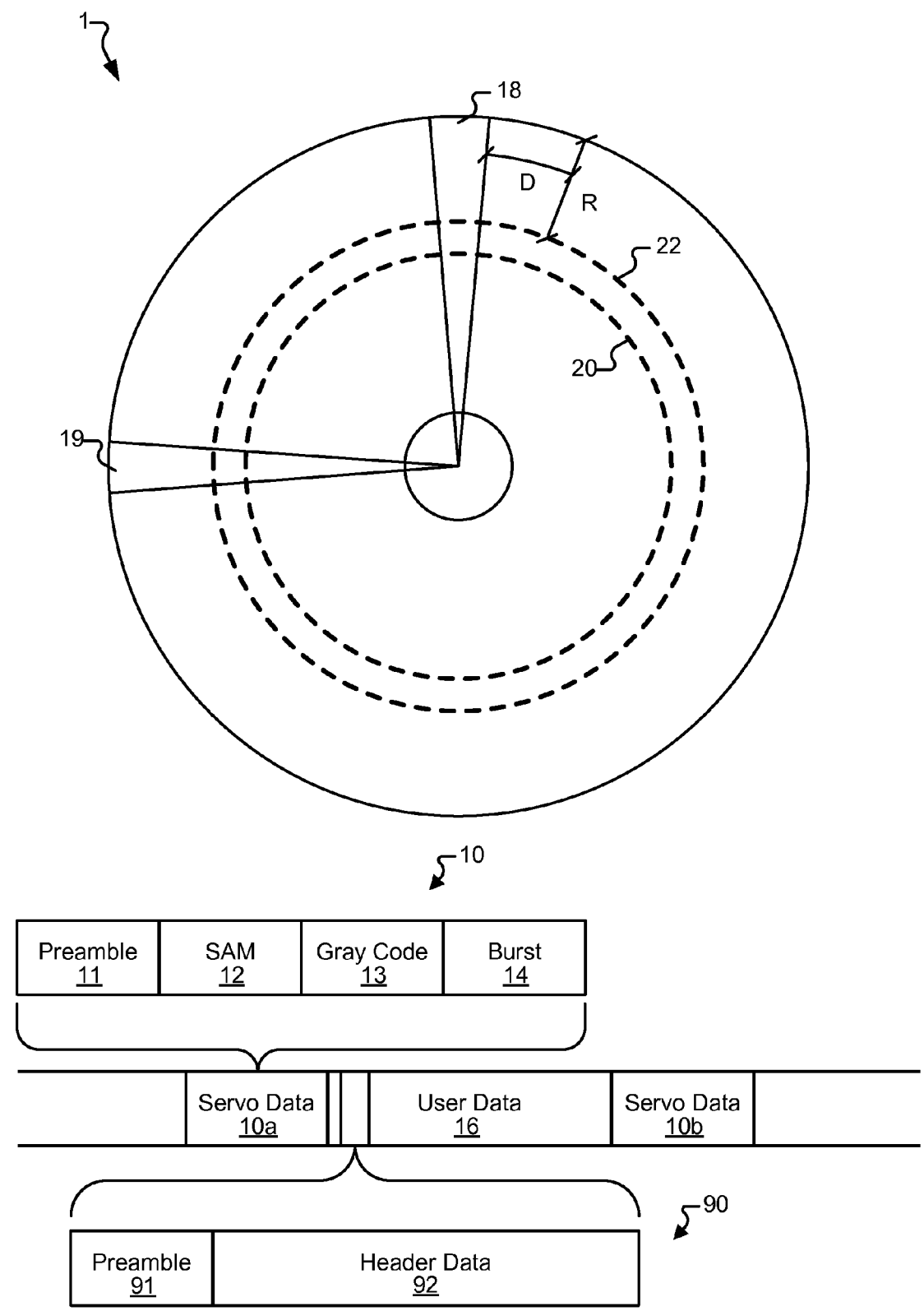
FIG. 1 is a block diagram of a storage medium and sector data scheme that may be used with a data processing system with adjacent track interference metric in accordance with one or more embodiments of the present invention.

Systems and methods relating generally to data processing, and more particularly to refreshing data stored to a storage medium.

Various embodiments of the present invention provide data processing systems with adjacent track interference metric calculation circuitry operable to calculate interference due to an adjacent track, and data refresh control signals generated based upon a confirmation of the calculated interference. When the calculated interference indicates sufficient adjacent track interference to suggest a re-write of the currently processing track, an adjacent track interference confirmation circuit confirms that the calculated interference is not unduly influenced by a head positioning error. Where a head positioning error does not significantly influence the calculated interference, the currently processing track is re-written to mitigate the impact of adjacent track writes.

The calculated interference is referred to herein as an adjacent track interference metric is may be calculated as a long magnet. The term "long magnet" is used herein to denote a bit within a run of same-valued bits, that is, a bit that has the same value as a number of preceding and subsequent bits. In some embodiments, a long magnet is defined as a bit with at least two preceding and subsequent bits having the same value, e.g., the center bits in the bit sequences "00000" or "11111" (i.e., a five bit long magnet). In other embodiments, other constant value run lengths are used to define a long magnet (e.g., seven bit long magnets). The adjacent track interference metric is based on errors detected in long magnets because long magnets are impacted relatively severely by repeated side track writes. The adjacent track interference metric or long magnet error sigma estimates the adjacent track interference degradation based on the standard deviation of the error signal of such long magnet bits.

Determining that the calculated interference indicates sufficient adjacent track interference to suggest a re-write of the currently processing track includes comparing the calculated interference with a threshold value. The threshold value may be calibrated in various embodiments using write and read tests and/or noise scaling using any of a number of techniques. When a re-write is found to be necessary, tracks may be refreshed in any suitable manner, such as by reading and re-writing the data to the same location or by reading the data, writing the data to a different location, and marking the original location as empty.

Some embodiments of the present invention provide data processing systems that include an adjacent track interference confirmation circuit. The adjacent track interference confirmation circuit is operable to receive an indication of an adjacent track interference; determine a causal connection between the adjacent track interference and a mis-alignment of a read head and a track on a storage medium from which a data set corresponding to the indication of the adjacent track interference is derived; and provide a re-write signal where even after reduction of the mis-alignment the indication of adjacent track interference repeats.

In some instances of the aforementioned embodiments, the re-write signal is operable to trigger a magnetic storage device to refresh data on the track from which the data set is derived. In one or more instances of the aforementioned embodiments, the data processing system further includes an adjacent track interference indication circuit operable to provide the indication of an adjacent track interference. The adjacent track interference indication circuit includes: a long magnet identification circuit operable to identify long magnet bits in the data set, the long magnet bits comprising bits having a same value as a number of preceding and subsequent bits; an error calculation circuit operable to subtract an ideal version of the long magnet bits from the long magnet bits to yield an error signal; an adjacent track interference metric calculation circuit operable to calculate an adjacent track interference metric based on the error signal; and a comparator circuit operable to compare the adjacent track interference metric with a threshold value and to provide the indication of the adjacent track interference when the adjacent track interference metric is greater than the threshold value.

In one or more instances of the aforementioned embodiments, the indication of the adjacent track interference is a first indication of the adjacent track interference, and the data set is an original data set. In such instances, determining the causal connection includes: modifying an offset of the read head relative to the center of the track to yield a modified offset; re-reading the data set from the track using the modified offset to yield an updated data set; and generating a second indication of the adjacent track interference based upon the updated data set. In some such instances, the indication of adjacent track interference repeats when the second indication of the adjacent track interference based upon the updated data set is generated. In one or more of the preceding instances, the data processing system further includes an adjacent track interference indication circuit operable to provide the first indication of an adjacent track interference and the second indication of the adjacent track interference. The adjacent track interference indication circuit includes: a long magnet identification circuit operable to identify a first set of long magnet bits in the original data set and a second set of long magnet bits in the updated data set; an error calculation circuit operable to subtract an ideal version of the first set of long magnet bits from the first set of long magnet bits to yield a first error signal, and to subtract an ideal version of the second set of long magnet bits from the second set of long magnet bits to yield a second error signal; an adjacent track interference metric calculation circuit operable to calculate a first adjacent track interference metric based on the first error signal and a second adjacent track metric based on the second error signal; and a comparator circuit operable to compare the first adjacent track interference metric with a threshold value and to provide the first indication of the adjacent track interference when the first adjacent track interference metric is greater than the threshold value, and compare the second adjacent track interference metric with the threshold value and to provide the second indication of the adjacent track interference when the second adjacent track interference metric is greater than the threshold value.

Other embodiments of the present invention provide data processing systems that include: a position error calculation circuit operable to calculate a distance from a read head to the center of a track fro which a data set is derived, and an adjacent track interference confirmation circuit. The adjacent track interference confirmation circuit is operable to: receive an indication of an adjacent track interference; compare the distance from the position error calculation circuit with a threshold value; and provide a re-write signal where the distance from the position error calculation circuit is less than the threshold value. In various instances of the aforementioned embodiments, the indication of the adjacent track interference is a first indication of the adjacent track interference, and the data set is an original data set. In such instances, the adjacent track interference confirmation circuit is further operable to: modify an offset of the read head relative to the center of the track to yield a modified offset; re-read the data set from the track using the modified offset to yield an updated data set; and generate a second indication of the adjacent track interference based upon the updated data set.

Turning to FIG. 1, a storage medium 1 is shown with two exemplary tracks 20, 22 indicated as dashed lines. The tracks are divided into sectors by servo data written within wedges 19, 18. These wedges include servo data 10 that are used for control and synchronization of a read/write head assembly over a desired location on storage medium 1. In particular, this servo data generally includes a preamble pattern 11 followed by a sector address mark 12 (SAM). Sector address mark 12 may include wedge identification information followed by the SAM. Sector address mark 12 is followed by a Gray code 13, and Gray code 13 is followed by burst information 14. Gray code 13 may include track identification information. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14.

Between the servo data bit patterns 10a and 10b, a user data region 16 is provided. User data region 16 includes some synchronization and header data 90 that includes a preamble pattern 91 and a head data 92 followed by user data within user data region 16. Based upon the disclosure provided herein, one of ordinary skill in the art will recognize a variety of data that may be included in header data 92.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. When reading data in user data region 16, synchronization to the data is done through use of preamble 91. In a write operation, the sensor would sense servo data from wedge 19 then write data to the user data region between wedge 19 and wedge 18. Then, the sensor would be switched to sense a remaining portion of the user data region followed by the servo data from wedge 18. Of note, wedges 18, 19 follow arcs corresponding to the geometry of an arm and pivot as is known in the art.

Figure 2:
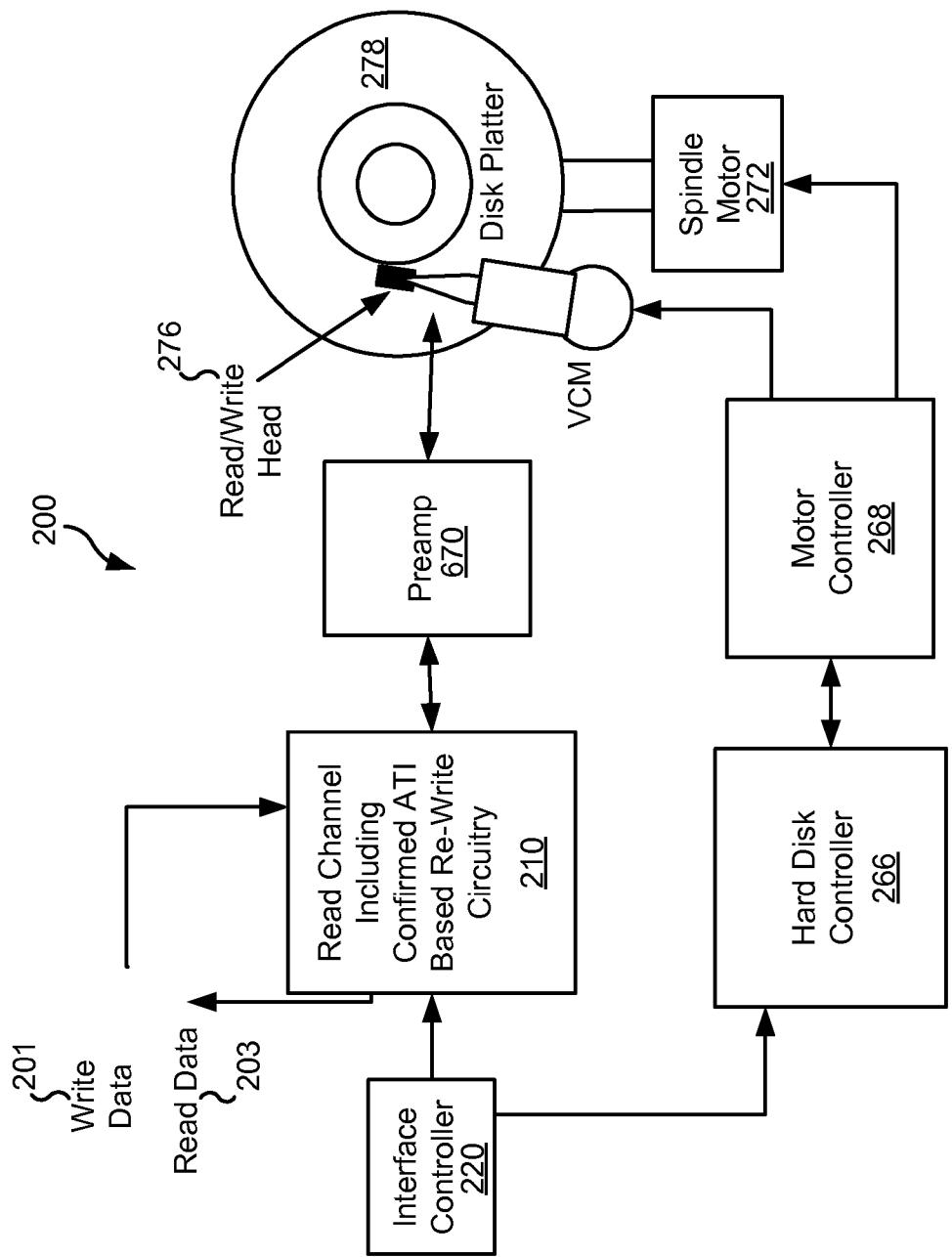
FIG. 2 shows a storage system that includes a read channel having confirmed adjacent track interference based re-write circuitry in accordance with various embodiments of the present invention.

Turning to FIG. 2, a storage system 200 is shown that includes a read channel 210 having confirmed adjacent track interference based re-write circuitry in accordance with one or more embodiments of the present invention. Storage system 200 may be, for example, a hard disk drive. Storage system 200 also includes a preamplifier 270, an interface controller 220, a hard disk controller 266, a motor controller 268, a spindle motor 272, a disk platter 278, and a read/write head 276. Read/write head 276 may include only a single read head for sensing data on disk platter 278, or may include multiple individual read heads each sensing data on a given track of disk platter 278. Interface controller 220 controls addressing and timing of data to/from disk platter 278, and interacts with a host controller (not shown). The data on disk platter 278 consists of groups of magnetic signals that may be detected by read/write head assembly 276 when the assembly is properly positioned over disk platter 278. In one embodiment, disk platter 278 includes magnetic signals recorded in accordance with either a longitudinal or a perpendicular recording scheme.

In a typical read operation, read/write head 276 is accurately positioned by motor controller 268 over a desired data track on disk platter 278. Motor controller 268 both positions read/write head 276 in relation to disk platter 278 and drives spindle motor 272 by moving read/write head assembly 276 to the proper data track on disk platter 278 under the direction of hard disk controller 266. Spindle motor 272 spins disk platter 278 at a determined spin rate (RPMs). Once read/write head 276 is positioned adjacent the proper data track, magnetic signals representing data on disk platter 278 are sensed by read/write head 276 as disk platter 278 is rotated by spindle motor 272. The sensed magnetic signals are provided as a continuous, minute analog signal representative of the magnetic data on disk platter 278. This minute analog signal is transferred from read/write head 276 to read channel circuit 210 via preamplifier 270. Preamplifier 270 is operable to amplify the minute analog signals accessed from disk platter 278. In turn, read channel circuit 210 decodes and digitizes the received analog signal to recreate the information originally written to disk platter 278. This data is provided as read data 203 to a receiving circuit. A write operation is substantially the opposite of the preceding read operation with write data 201 being provided to read channel circuit 210. This data is then encoded and written to disk platter 278.

The data streams developed from either the single read head or the multiple read heads included in read/write head 276 are processed to calculate an adjacent track interference metric. It is determined whether the calculated adjacent track interference metric suggests that the currently processing track needs to be re-written to mitigate the effects of adjacent track writing. This determination may be made, for example, by comparing the adjacent track interference metric with a threshold value that may be either fixed, user programmable, or dynamically calibrated. When the calculated adjacent track interference metric indicates sufficient adjacent track interference to suggest a re-write of the currently processing track, an adjacent track interference confirmation circuit confirms that the calculated interference is not unduly influenced by a head positioning error. Where a head positioning error does not significantly influence the calculated interference, the currently processing track is re-written to mitigate the impact of adjacent track writes. When a re-write is found to be necessary, tracks may be refreshed in any suitable manner, such as by reading and re-writing the data to the same location or by reading the data, writing the data to a different location, and marking the original location as empty. The data processing circuitry including confirmed adjacent track interference based re-write circuitry may be implemented similar to that discussed below in relation to FIGS. 3, 6, 8. The processes of confirming a re-write is discussed below in relation to FIGS. 5, 7, 9.

It should be noted that storage system 200 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 200, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 210 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 200 may be modified to include solid state memory that is used to store data in addition to the storage offered by disk platter 278. This solid state memory may be used in parallel to disk platter 278 to provide additional storage. In such a case, the solid state memory receives and provides information directly to read channel circuit 210. Alternatively, the solid state memory may be used as a cache where it offers faster access time than that offered by disk platted 278. In such a case, the solid state memory may be disposed between interface controller 220 and read channel circuit 210 where it operates as a pass through to disk platter 278 when requested data is not available in the solid state memory or when the solid state memory does not have sufficient storage to hold a newly written data set. Based upon the disclosure provided herein, one of ordinary skill in the art will recognize a variety of storage systems including both disk platter 278 and a solid state memory.

Figure 3:
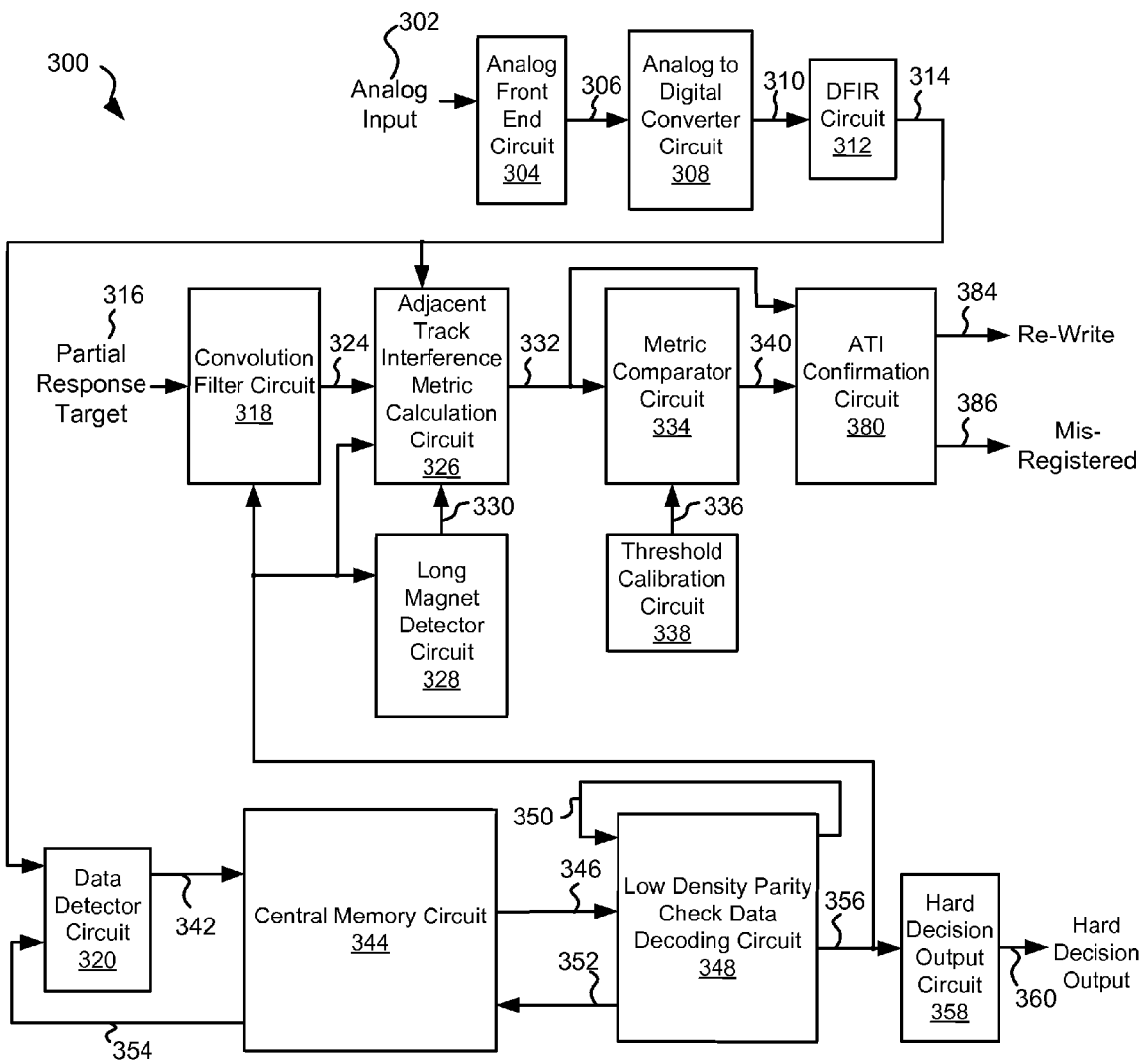
FIG. 3 is a block diagram of a data processing system including confirmed adjacent track interference confirmation circuitry in accordance with some embodiments of the present invention.

Turning to FIG. 3, a data processing circuit 300 including an adjacent track interference confirmation circuit 380 operable to confirm an indication of sufficient adjacent track interference to cause a data re-write is shown in accordance with various embodiments of the present invention. Data processing circuit 300 includes an analog front end circuit 304 that receives an analog signal 302. Analog front end circuit 304 processes analog signal 302 and provides a processed analog signal 306 to an analog to digital converter circuit 308. Analog front end circuit 304 may include, but is not limited to, an analog filter and an amplifier circuit as are known in the art. Based upon the disclosure provided herein, one of ordinary skill in the art will recognize a variety of circuitry that may be included as part of analog front end circuit 308. In some cases, analog input signal 302 is derived from a read/write head assembly (not shown) that is disposed in relation to a storage medium (not shown). Based upon the disclosure provided herein, one of ordinary skill in the art will recognize a variety of sources from which analog signal 302 may be derived.

Analog to digital converter circuit 308 converts processed analog signal 306 into a corresponding series of digital samples 310 or X samples. Analog to digital converter circuit 308 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

An equalizer circuit 312 receives digital samples 310 and applies an equalization algorithm to digital samples 310 to yield an equalized output 314, or Y samples. In some embodiments of the present invention, equalizer circuit 312 is a digital finite impulse response filter circuit as are known in the art. In some cases, equalizer circuit 312 includes sufficient memory to maintain one or more codewords until a data detector circuit 320 is available for processing, and for multiple passes through data detector circuit 320.

Data detector circuit 320 is a circuit capable of producing a detected output 342 by applying a data detection algorithm to a data input. In some embodiments, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. In some embodiments, data detector circuit 320 provides both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 342 is provided to a central queue memory circuit 344 that operates to buffer data passed between data detector circuit 320 and data decoder circuit 348. When data decoder circuit 348 is available, data decoder circuit 348 receives detected output 342 from central queue memory 344 as a decoder input 346. Data decoder circuit 320 applies a data decoding algorithm to decoder input 346 in an attempt to recover originally written data. The result of the data decoding algorithm is provided as a decoded output 352. Similar to detected output 342, decoded output 352 includes both hard decisions and soft decisions in some embodiments. Data decoder circuit 348 may be any data decoder circuit known in the art that is capable of applying a decoding algorithm to a received input. Data decoder circuit 348 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 348 provides the result of the data decoding algorithm as a decoded output 356. Decoded output 356 is provided to a hard decision output circuit 358 where the data is reordered before providing a series of ordered data sets as a data output 360.

One or more iterations through the combination of data detector circuit 320 and data decoder circuit 348 may be made in an effort to converge on the originally written data set. For the first global iteration, data detector circuit 320 applies the data detection algorithm without guidance from a decoded output. For subsequent global iterations, data detector circuit 320 applies the data detection algorithm to buffered equalized output 314 as guided by decoded output 352. Decoded output 352 is received from central queue memory 344 as a detector input 354.

During each global iteration it is possible for data decoder circuit 348 to make one or more local iterations including application of the data decoding algorithm to decoder input 346. For the first local iteration, data decoder circuit 348 applies the data decoder algorithm without guidance from a decoded output 350. For subsequent local iterations, data decoder circuit 348 applies the data decoding algorithm to decoder input 346 as guided by a previous decoded output 350.

As part of a read operation, an adjacent track interference metric calculator 326 calculates an adjacent track interference metric 332 to determine whether the current sector from a target track has been degraded by write operations to adjacent tracks. Sectors are degraded when their side tracks are written many times. The adjacent track interference metric estimates the degradation from the readback signal, based on a comparison of the equalized output 314 and the true values of the equalized output 314 as represented by decoded values 356 in this embodiment, using either or both soft decisions and hard decisions. The resulting adjacent track interference metric 332 can be used for making decisions to rewrite the degraded sectors.

In some embodiments in which the true values of the equalized output 314 as represented by Y ideal values 324 are used to calculate the adjacent track interference metric 332, a convolution filter circuit 318 convolves the decoded output 356 with the partial response target 316 of the data channel to yield the Y ideal values 324. Convolution filter circuit 318 may be any circuit known in the art that is capable of applying target based filtering to an input signal to yield an output conformed to a target. Based upon the disclosure provided herein, one of ordinary skill in the art will recognize a variety of circuitry that may be included as part of convolution filter circuit 318 to generate Y ideal values 324. In some embodiments in which the true values of the equalized output 314 are represented by Y ideal values 324, the adjacent track interference metric calculator 326 calculates the difference between the equalized output 314 and the Y ideal values 324 on a bit by bit basis according to the following equation, yielding an error signal $Y_{err}[i]$, where index i is the bit index in the stream for a data sector:

$$Y_{err}[i]=Y[i]-Y_{ideal}[i],$$

where Y[i] is the equalized Y sample bit at index i, and $Y_{ideal}[i]$ is the ideal or true value for the corresponding bit. Again, the $Y_{ideal}[i]$ value can be determined in any of a number of manners in various embodiments. In some embodiments, $Y_{ideal}[i]$ is calculated by convolving a detected value or hard decision, obtained from a data detector such as, but not limited to, a Viterbi detector, with a partial response target for the data channel, yielding Y ideal values 324. In some embodiments, $Y_{ideal}[i]$ is a detected value or hard decision in detected output 342 (not shown) or using decoded output 356 (as is shown). In some cases, Y ideal value 324 input to adjacent track interference metric calculator 326 can be omitted.

Adjacent track interference metric 332, also referred to herein as long magnet error sigma $Z_L$, is calculated in some embodiments as the standard deviation of the error signal $Y_{err}[i]$, considering only long magnet bits. In some embodiments, adjacent track interference metric calculator 326 calculates the error signal $Y_{err}[i]$ only for long magnets, based on a long magnet detected signal 330 generated by long magnet detector 328. In some other embodiments, adjacent track interference metric calculator 326 calculates error signal $Y_{err}[i]$ for all bits, then calculates adjacent track interference metric 332 for only long magnets. The long magnet detector 328 compares the current bit with the previous and subsequent bits to determine if they have the same value. For example, if the current bit is a 0, and the two previous bits and the two subsequent bits are also 0, the long magnet detector 328 asserts the long magnet detected signal 330. Long magnet detector circuit 328 may operate on any bit input to adjacent track interference metric calculator 326 to determine whether the current bit being processed by adjacent track interference metric calculator 326 is a long magnet, such as, but not limited to, the detected output 342 (not shown) or equalized output 314 (as is shown). Long magnet detector circuit 328 may be any circuit for identifying a long magnet. Based upon the disclosure provided herein, one of ordinary skill in the art will recognize a variety of circuitry that may be included as part of long magnet detector 328.

Adjacent track interference metric 332 or long magnet error sigma $Z_L$ is computed in some embodiments in adjacent track interference metric calculator 326 as the standard deviation of the error signal by the mean and mean square of the error signal according to the following equation:

$$Z_L=(E_{iew}[Y_{err}[i]^2]-E_{iew}^2[Y_{err}[i]])^{1/2},$$

where $Y_{err}[i]$ is the error signal corresponding to a non-return to zero value a[i] of bit i. Adjacent track interference metric calculator 326 may be any circuit for calculating adjacent track interference metric 332 as disclosed herein. Based upon the disclosure provided herein, one of ordinary skill in the art will recognize a variety of circuitry that may be included as part of adjacent track interference metric calculator 326. As just some examples, U.S. patent application Ser. No. 13/963, 589 entitled "Data Processing System With Adjacent Track Interference Metric", and filed Aug. 9, 2013 by Hwang et al. The entirety of the aforementioned application is incorporated herein by reference for all purposes.

A metric comparator circuit 334 compares adjacent track interference metric 332 with a threshold 336. If adjacent track interference metric 332 exceeds threshold 336, a possible adjacent track interference is indicated by asserting an interference signal 340. Adjacent track interference confirmation circuit 380 operates to determine whether the identified possible adjacent track interference is due to improper positioning of the head relative to the target track (i.e., track mis-registration) which would have the affect of increasing the appearance of adjacent track interference as the head would be located closer to the adjacent track, of whether the identified possible adjacent track interference reflects degradation in the target track due to writing and re-writing the adjacent track(s). Where it is determined that interference signal 340 is asserted due to track mis-registration, a re-write of the track is not initiated, but rather a mis-registered signal 386 is asserted by adjacent track interference confirmation circuit 380.

Alternatively, where it is determined that interference signal 340 is not asserted due to track mis-registration, a re-write of the track is initiated by asserting a re-write signal 384. When re-write signal 384 is asserted, the currently processing sector is refreshed in any suitable manner by the storage device. In some embodiments, the storage device controller reads the sector and rewrites the sector in place.

Threshold 336 is generated by a threshold calibration circuit 338, which calibrates threshold 336 at a point where adjacent track interference metric 332 indicates that the sector has been degraded by adjacent track writes, but before the sector has been degraded to the point where it cannot be successfully refreshed. In some embodiments that use a data decoder circuit 348 in a read operation to obtain the correct values of the data, a sector can be refreshed by re-writing the sector with the data from the data decoder circuit 348. In such embodiments, data processing circuit 300 can be caused to process increasingly degraded data until the data decoder circuit 348 can no longer converge on the correct values. Threshold calibration circuit 338 determines the value of adjacent track interference metric 332 for the degraded data that causes the data decoder circuit 348 to fail, and sets threshold 336 at a lower level at which the data is somewhat degraded but will not cause the data decoder circuit 348 to fail. This enables data to be refreshed after degradation begins but before it cannot be correctly read and refreshed. The cushion between threshold 336 and the value of adjacent track interference metric 332 at the point where the data has degraded too much for recovery by data decoder circuit 348 can be adjusted as desired to balance the risk of data corruption and too frequent refreshes. The threshold calibration process can be performed during manufacturing or at any other suitable point. Threshold calibration circuit 338 may be any circuit for determining the level of threshold 336. Based upon the disclosure provided herein, one of ordinary skill in the art will recognize a variety of circuitry that may be included as part of threshold calibration circuit 338. Several embodiments of the threshold calibration are discussed in U.S. patent application Ser. No. 13/963,589 entitled "Data Processing System With Adjacent Track Interference Metric", and filed Aug. 9, 2013 by Hwang et al. The entirety of the aforementioned application was previously incorporated herein by reference for all purposes.

In some embodiments of the present invention, adjacent track interference confirmation circuit 380 determines whether the identified possible adjacent track interference is due to track mis-registration by causing the data to be re-read using a different head offset relative to the target track, and comparing the results. In particular, where interference signal 340 is asserted adjacent track interference confirmation circuit 380 stores the current value of adjacent track interference metric 332 as an initial value, and causes a re-read of the currently processing sector from the track on the storage medium, but at a modified offset from the center of the track. The modified offset is a small change added to the original track location (i.e., the original track location may be considered a defined offset). In one particular embodiment of the present invention, the small change is 10% of the overall track width, thus the modified offset is calculated in accordance with the following equation:

Modified Offset=Defined Offset+0.1TP, where TP is the overall track width. It should be noted that the small change may be subtracted from the defined offset in place of the addition.

The data read from the same sector and track as the originally read data, but at the modified offset is re-processed through analog front end circuit 304, analog to digital converter circuit 308, equalizer circuit 312 and an updated value for adjacent track interference metric 332 is calculated for the newly read data. Adjacent track interference confirmation circuit 380 compares the newly calculated instance of adjacent track interference metric 332 with the previously stored initial value. Where adjacent track interference confirmation circuit 380 determines that the initial metric is less than the newly calculated instance of adjacent track interference metric 332, it is assumed that the reason the initial metric was greater than the threshold value is not due to mis-registration, and in such a case adjacent track interference confirmation circuit 380 asserts re-write output 384 that causes the currently processing sector to be re-written to the track. Alternatively, where adjacent track interference confirmation circuit 380 determines that the initial metric is more than the newly calculated instance of adjacent track interference metric 332, it is assumed that the reason the initial metric was greater than the threshold value was due to mis-registration, and in such a case the currently processing sector is not re-written and adjacent track interference confirmation circuit 380 asserts mis-registration output 386.

The following pseudo-code shows one example operation of adjacent track interference confirmation circuit 380:
If (interference signal 340 is asserted){
   store the current adjacent track interference metric 332 as an initial metric;

Modified Offset=Defined Offset+0.1TP;

re-read the currently processing sector using the modified offset;
   re-calculate adjacent track interference metric 332 using the newly read data to yield an updated metric;
   If(updated metric>initial metric){/*smaller track mis-registration*/ cause re-write of the currently processing sector by asserting re-write signal 384;
   }
   Else if (updated metric<initial metric){/*larger track mis-registration*/ assert mis-registration signal 386;
   }
}
The aforementioned can be augmented to include the optional processes of testing the other side of the defined offset by subtracting 0.1TP from the defined offset and retesting the newly calculated adjacent track interference metric 332.

Figure 4:
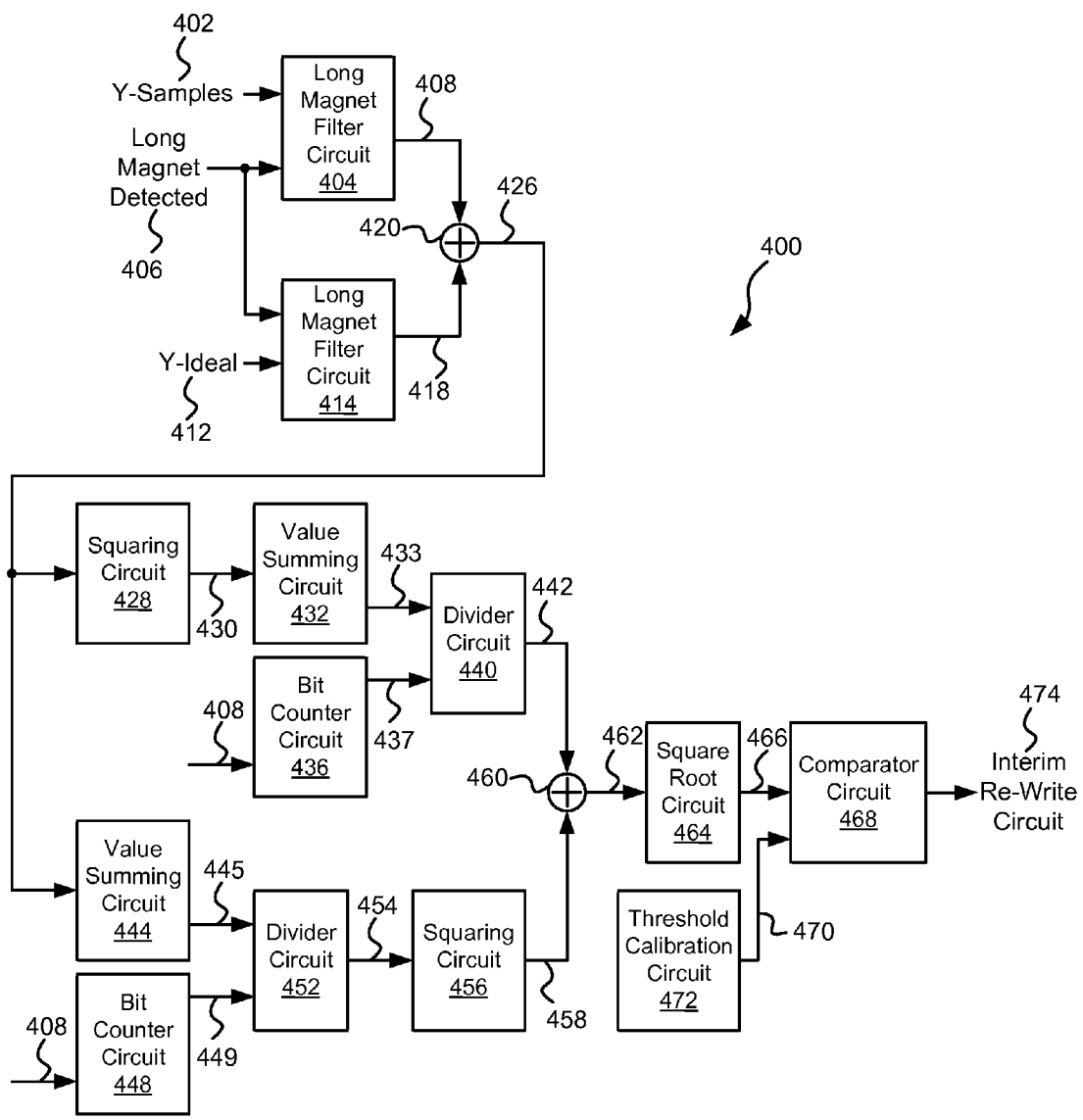
FIG. 4 depicts an adjacent track interference metric calculation circuit that may be used in relation to different embodiments of the present invention.

Turning to FIG. 4, one example of an adjacent track interference metric calculation circuit 400 is shown that may be used in relation to different embodiments of the present invention. Adjacent track interference metric calculation circuit 400 may be used in place of adjacent track interference metric calculation circuit 326 discussed above in relation to FIG. 3. Adjacent track interference metric calculation circuit 400 calculates an adjacent track interference metric 466 $Z_L$ based on a comparison of Y samples at input 402 and Y ideal values at input 412. In this embodiment, adjacent track interference metric calculation circuit 400 first calculates an error signal 426 $Y_{err}[i]$ according to the following equation for long magnets:

$$Y_{err}[i]=Y[i]-Y_{ideal}[i],$$

where $Y[i]$ is the equalized Y sample bit at index i, and $Y_{ideal}[i]$ is the ideal or true value for the corresponding bit. Then, adjacent track interference metric calculation circuit 400 calculates the adjacent track interference metric 466 as the standard deviation of error signal 426 according to the following equation:

$$Z_L=(E_{ie\psi}[Y_{err}[i]^2]-E_{ie\psi}^2[Y_{err}[i]])^{1/2},$$

where $Y_{err}[i]$ is the error signal corresponding to a non-return to zero value a[i] of bit i.

The Y samples at input 402 are filtered in a long magnet filter 404 based on a long magnet detected signal 406 to pass only long magnets 408. Similarly, the Y ideal values at input 412 are filtered in a long magnet filter 414 based on a long magnet detected signal 416, which in some embodiments is equivalent to long magnet detected signal 406, yielding long magnet ideal values 418. The ideal values 418 are subtracted from the sample values 408 in subtractor 420, yielding error signal 426.

The error signal 426 is squared in multiplier 428, yielding squared error signal 430. Value summer circuit 432 accumulates or totals the squared errors, bit counter 436 counts the number of long magnet bits, and divider 440 divides the total squared errors by the number of errors to yield the mean of the squared errors 442. Value summer circuit 444 accumulates or totals the errors, bit counter 448 counts the number of long magnet bits, and divider 452 divides the total errors by the number of errors to yield the mean of the errors 454, which is then squared in multiplier 456 to yield the squared mean of the errors 458. (In some embodiments, bit counters 436 and 448 are embodied in a single counter.) The squared mean of the errors 458 is subtracted from the mean of the squared errors 442 in subtractor 460, and square root circuit 464 calculates the square root of the difference 462 to yield the adjacent track interference metric 466 $Z_L$. A comparator 468 compares the adjacent track interference metric 466 $Z_L$ with a threshold 470, set by threshold calibration circuit 472, asserting refresh signal 474 when adjacent track interference metric 466 exceeds threshold 470.

Figure 5:
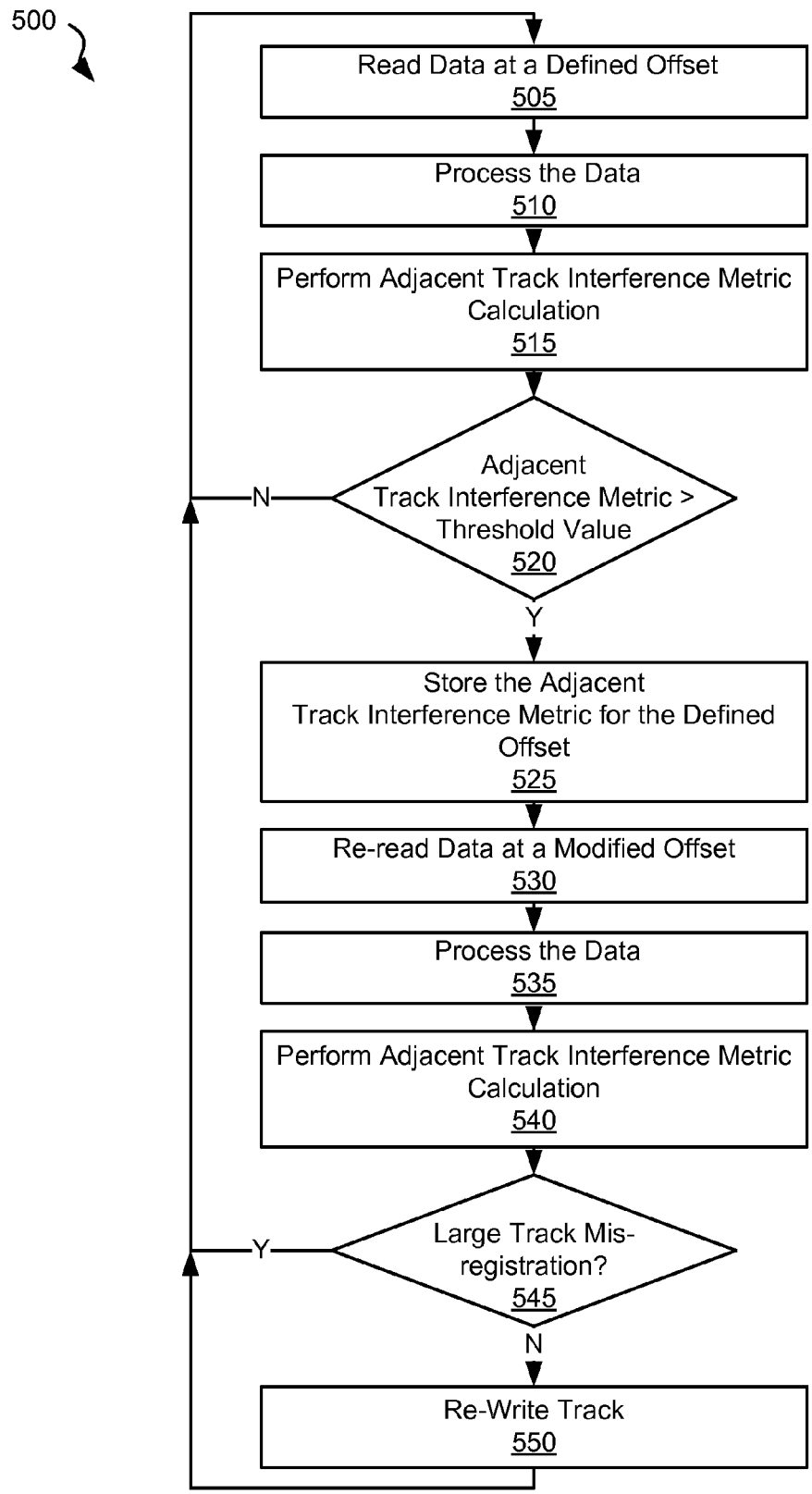
FIG. 5 is a flow diagram showing a method for confirming track re-write in accordance with various embodiments of the present invention.

Turning to FIG. 5, a flow diagram 500 shows a method for confirming track re-write in accordance with various embodiments of the present invention. Following flow diagram 500, data is accessed from a storage medium at a defined offset from a center of the track (block 505). In some cases, the defined offset is the expected center of the track. The data is then processed (block 510). This processing may include, but is not limited to, converting the data from an analog signal to a series of corresponding digital samples to yield X-data, and, in some cases, equalizing the series of digital samples to yield Y-data. An adjacent track interference metric calculation is then performed on either the X-data or the Y-data depending upon the particular implementation to yield an initial adjacent track interference metric (block 515). The adjacent track interference metric may be calculated using any approach known in the art for calculating a value indicative of inter-track interference. As just some examples, the adjacent track interference metric may be calculated similar to that discussed in U.S. patent application Ser. No. 13/963,589 entitled "Data Processing System With Adjacent Track Interference Metric", and filed Aug. 9, 2013 by Hwang et al. The entirety of the aforementioned application was previously incorporated herein by reference for all purposes.

It is determined whether the adjacent track interference metric exceeds a threshold value (block 520). Where the adjacent track interference metric does not exceed the threshold value (block 520), the amount of adjacent track interference is found to be sufficiently low that a re-write of the currently processing sector on the track is not warranted. In contrast, where the adjacent track interference metric exceeds the threshold value (block 520), the amount of adjacent track interference is found to be sufficiently high that a re-write of the currently processing sector on the track would be warranted if the head is properly centered over the track being read (i.e., defined offset is close to the center of the track).

To determine whether the head is properly centered over the track being read, the adjacent track interference metric for the defined offset is stored (block 525), and the data from the track is re-read using a modified offset (block 530). The modified offset may be the defined offset plus a small change. In one particular embodiment of the present invention, the small change is 10% of the overall track width, thus the modified offset is calculated in accordance with the following equation:

$$\text{Modified Offset} = \text{Defined Offset} + 0.1 TP,$$

where TP is the overall track width. It should be noted that the small change may be subtracted from the defined offset in place of the addition.

The data read from the same sector and track as the originally read data, but at the modified offset (block 530) is processed using the same processing discussed above in relation to block 510 (block 535). The same adjacent track interference metric calculation done in block 515 is performed to yield an updated metric (block 540). The initial metric and the updated metric are then used to determine whether the reason that the initial metric was greater than the threshold value was due to track mis-registration (block 545). In particular, where it is determined that the initial metric is less than the updated metric, it is assumed that the reason the initial metric was greater than the threshold value is not due to mis-registration, and in such a case the currently processing sector is re-written to the track (block 550). Alternatively, where the initial metric is greater than the updated metric, it is assumed that the reason the initial metric was greater than the threshold value was due to mis-registration, and in such a case the currently processing sector is not re-written.

Optionally, to determine whether the head is properly centered over the track being read, the adjacent track interference metric for the defined offset is stored (block 525), and the data from the track is re-read using two modified offsets. The first modified offset is as discussed above in relation to block 530, the second modified offset is in the opposite direction as the modified offset of block 530. The two modified offsets are calculated in accordance with the following equations:

$$\text{First Modified Offset} = \text{Defined Offset} + 0.1 TP,$$

$$\text{Second Modified Offset} = \text{Defined Offset} - 0.1 TP$$

where TP is the overall track width. The re-read data for both of the modified offsets is processed and respective updated metrics are calculated. Where the updated metric for the first modified output indicates a large track mis-registration, the processes of blocks 525-545 are performed using the second modified offset.

Figure 6:
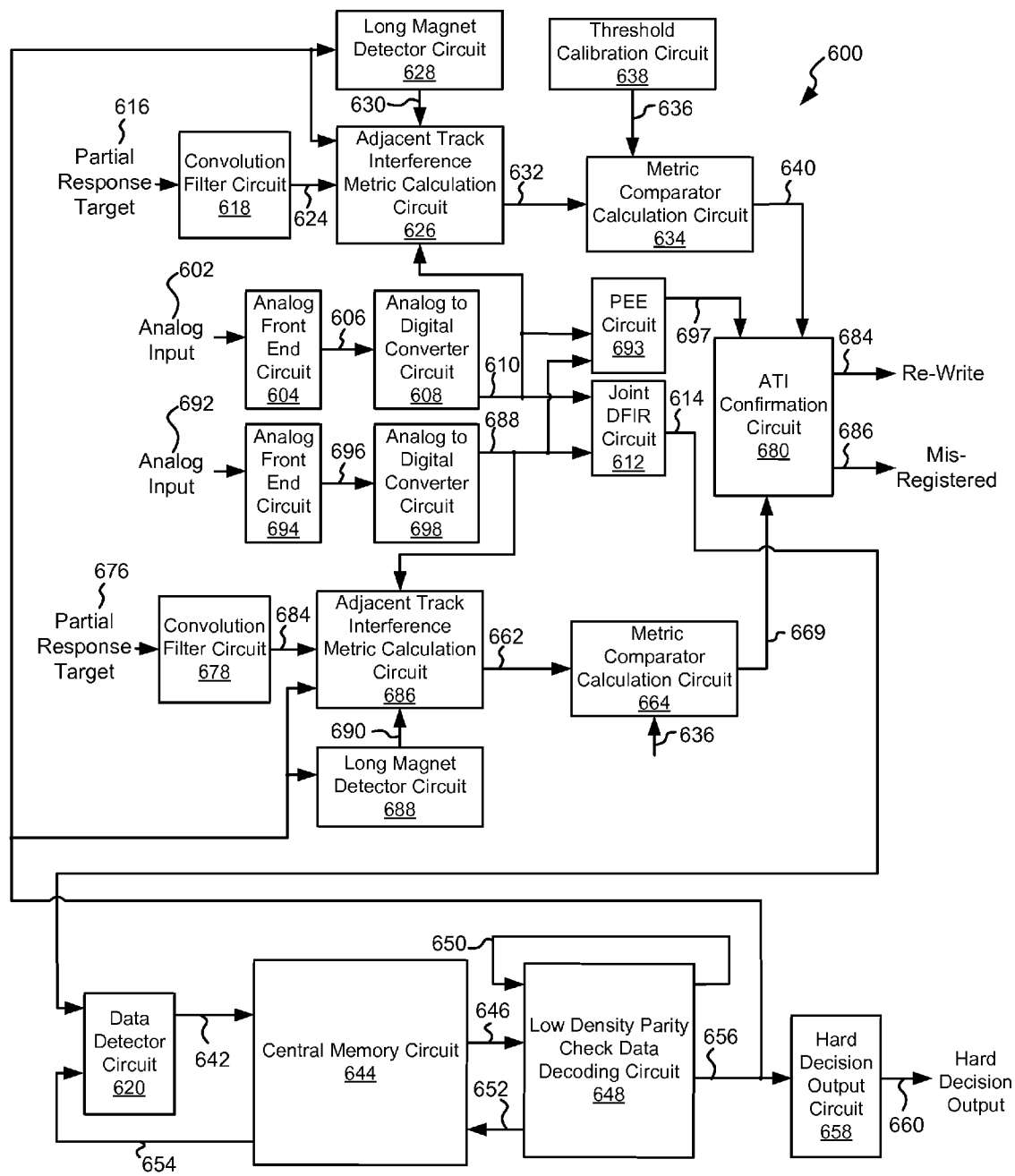
FIG. 6 shows a multi-head data processing circuit including X-based adjacent track interference confirmation circuitry in accordance with various embodiments of the present invention.

Turning to FIG. 6, a multi-head data processing circuit 600 including an X-based adjacent track interference confirmation circuit 680 operable to confirm an indication of sufficient adjacent track interference to cause a data re-write is shown in accordance with various embodiments of the present invention. Data processing circuit 600 includes an analog front end circuit 604 that receives an analog signal 602 derived from a first read head. Analog front end circuit 604 processes analog signal 602 and provides a processed analog signal 606 to an analog to digital converter circuit 608. Analog front end circuit 604 may include, but is not limited to, an analog filter and an amplifier circuit as are known in the art. Based upon the disclosure provided herein, one of ordinary skill in the art will recognize a variety of circuitry that may be included as part of analog front end circuit 608. In some cases, analog input signal 602 is derived from a read/write head assembly (not shown) that is disposed in relation to a storage medium (not shown). Based upon the disclosure provided herein, one of ordinary skill in the art will recognize a variety of sources from which analog signal 602 may be derived.

Analog to digital converter circuit 608 converts processed analog signal 606 into a corresponding series of digital samples 610 or X samples. Analog to digital converter circuit 608 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

Additionally, data processing circuit 600 includes an analog front end circuit 694 that receives an analog signal 692 derived from a second read head. Analog front end circuit 694 processes analog signal 692 and provides a processed analog signal 696 to an analog to digital converter circuit 698. Analog front end circuit 694 may include, but is not limited to, an analog filter and an amplifier circuit as are known in the art. Based upon the disclosure provided herein, one of ordinary skill in the art will recognize a variety of circuitry that may be included as part of analog front end circuit 698. In some cases, analog input signal 692 is derived from a read/write head assembly (not shown) that is disposed in relation to a storage medium (not shown). Based upon the disclosure provided herein, one of ordinary skill in the art will recognize a variety of sources from which analog signal 692 may be derived.

Analog to digital converter circuit 698 converts processed analog signal 696 into a corresponding series of digital samples 688 or X samples. Analog to digital converter circuit 698 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

A joint equalizer circuit 612 receives digital samples 610 and digital samples 688, and applies a joint equalization to yield a unified equalized output 614 or Y-samples. Joint equalizer circuit 612 may be any equalization circuit operable to equalize two or more input data sets to yield a unified equalized output. In some cases, joint equalizer circuit 612 includes sufficient memory to maintain one or more codewords until a data detector circuit 620 is available for processing, and for multiple passes through data detector circuit 620.

Data detector circuit 620 is a circuit capable of producing a detected output 642 by applying a data detection algorithm to a data input. In some embodiments, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. In some embodiments, data detector circuit 620 provides both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 642 is provided to a central queue memory circuit 644 that operates to buffer data passed between data detector circuit 620 and data decoder circuit 648. When data decoder circuit 648 is available, data decoder circuit 648 receives detected output 642 from central queue memory 644 as a decoder input 646. Data decoder circuit 620 applies a data decoding algorithm to decoder input 646 in an attempt to recover originally written data. The result of the data decoding algorithm is provided as a decoded output 652. Similar to detected output 642, decoded output 652 includes both hard decisions and soft decisions in some embodiments. Data decoder circuit 648 may be any data decoder circuit known in the art that is capable of applying a decoding algorithm to a received input. Data decoder circuit 648 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 648 provides the result of the data decoding algorithm as a decoded output 656. Decoded output 656 is provided to a hard decision output circuit 658 where the data is reordered before providing a series of ordered data sets as a data output 660.

One or more iterations through the combination of data detector circuit 620 and data decoder circuit 648 may be made in an effort to converge on the originally written data set. For the first global iteration, data detector circuit 620 applies the data detection algorithm without guidance from a decoded output. For subsequent global iterations, data detector circuit 620 applies the data detection algorithm to buffered equalized output 614 as guided by decoded output 652. Decoded output 652 is received from central queue memory 644 as a detector input 654.

During each global iteration it is possible for data decoder circuit 648 to make one or more local iterations including application of the data decoding algorithm to decoder input 646. For the first local iteration, data decoder circuit 648 applies the data decoder algorithm without guidance from a decoded output 650. For subsequent local iterations, data decoder circuit 648 applies the data decoding algorithm to decoder input 646 as guided by a previous decoded output 650.

As part of a read operation, an adjacent track interference metric calculator 626 calculates an adjacent track interference metric 632 based upon data derived from the first read head to determine whether the current sector from a target track as sensed by the first read head has been degraded by write operations to adjacent tracks. Again, sectors are degraded when their side tracks are written many times. The adjacent track interference metric estimates the degradation from the readback signal, based on a comparison of the equalized output 614 and the true values of the equalized output 614 as represented by decoded values 656 in this embodiment, using either or both soft decisions and hard decisions. The resulting adjacent track interference metric 632 can be used for making decisions to rewrite the degraded sectors.

In some embodiments in which the true values of the equalized output 614 as represented by Y ideal values 624 are used to calculate the adjacent track interference metric 632, a convolution filter circuit 618 convolves the decoded output 656 with the partial response target 616 of the data channel to yield the Y ideal values 624. Convolution filter circuit 618 may be any circuit known in the art that is capable of applying target based filtering to an input signal to yield an output conformed to a target. Based upon the disclosure provided herein, one of ordinary skill in the art will recognize a variety of circuitry that may be included as part of convolution filter circuit 618 to generate Y ideal values 624. In some embodiments in which the true values of the equalized output 614 are represented by Y ideal values 624, the adjacent track interference metric calculator 626 calculates the difference between the equalized output 614 and the Y ideal values 624 on a bit by bit basis according to the following equation, yielding an error signal $Y_{err}[i]$, where index i is the bit index in the stream for a data sector:

$$Y_{err}[i]=Y[i]-Y_{ideal}[i],$$

where Y[i] is the equalized Y sample bit at index i, and $Y_{ideal}[i]$ is the ideal or true value for the corresponding bit. Again, the $Y_{ideal}[i]$ value can be determined in any of a number of manners in various embodiments. In some embodiments, $Y_{ideal}[i]$ is calculated by convolving a detected value or hard decision, obtained from a data detector such as, but not limited to, a Viterbi detector, with a partial response target for the data channel, yielding Y ideal values 624. In some embodiments, $Y_{ideal}[i]$ is a detected value or hard decision in detected output 642 (not shown) or using decoded output 656 (as is shown). In some cases, Y ideal value 624 input to adjacent track interference metric calculator 626 can be omitted.

Adjacent track interference metric 632, also referred to herein as long magnet error sigma $Z_L$, is calculated in some embodiments as the standard deviation of the error signal $Y_{err}[i]$, considering only long magnet bits. In some embodiments, adjacent track interference metric calculator 626 calculates the error signal $Y_{err}[i]$ only for long magnets, based on a long magnet detected signal 630 generated by long magnet detector 628. In some other embodiments, adjacent track interference metric calculator 626 calculates error signal $Y_{err}[i]$ for all bits, then calculates adjacent track interference metric 632 for only long magnets. The long magnet detector 628 compares the current bit with the previous and subsequent bits to determine if they have the same value. For example, if the current bit is a 0, and the two previous bits and the two subsequent bits are also 0, the long magnet detector 628 asserts the long magnet detected signal 630. Long magnet detector circuit 628 may operate on any bit input to adjacent track interference metric calculator 626 to determine whether the current bit being processed by adjacent track interference metric calculator 626 is a long magnet, such as, but not limited to, the detected output 642 (not shown) or equalized output 614 (as is shown). Long magnet detector circuit 628 may be any circuit for identifying a long magnet. Based upon the disclosure provided herein, one of ordinary skill in the art will recognize a variety of circuitry that may be included as part of long magnet detector 628.

Adjacent track interference metric 632 or long magnet error sigma $Z_L$ is computed in some embodiments in adjacent track interference metric calculator 626 as the standard deviation of the error signal by the mean and mean square of the error signal according to the following equation:

$$Z_L = (E_{i\in\psi}[Y_{err}[i]^2] - E_{i\in\psi}^2[Y_{err}[i]])^{1/2},$$

where $Y_{err}[i]$ is the error signal corresponding to a non-return to zero value a[i] of bit i. Adjacent track interference metric calculator 626 may be any circuit for calculating adjacent track interference metric 632 as disclosed herein. Based upon the disclosure provided herein, one of ordinary skill in the art will recognize a variety of circuitry that may be included as part of adjacent track interference metric calculator 626. As just some examples, U.S. patent application Ser. No. 13/963,589 entitled "Data Processing System With Adjacent Track Interference Metric", and filed Aug. 9, 2013 by Hwang et al. The entirety of the aforementioned application is incorporated herein by reference for all purposes. A metric comparator circuit 634 compares adjacent track interference metric 632 with a threshold 636. If adjacent track interference metric 632 exceeds threshold 636, a possible adjacent track interference is indicated by asserting an interference signal 640.

Additionally, an adjacent track interference metric calculator 686 calculates an adjacent track interference metric 662 based upon data derived from the second read head to determine whether the current sector from a target track as sensed by the first read head has been degraded by write operations to adjacent tracks. Again, sectors are degraded when their side tracks are written many times. The adjacent track interference metric estimates the degradation from the readback signal, based on a comparison of the equalized output 614 and the true values of the equalized output 614 as represented by decoded values 656 in this embodiment, using either or both soft decisions and hard decisions. The resulting adjacent track interference metric 662 can be used for making decisions to rewrite the degraded sectors.

In some embodiments in which the true values of the equalized output 614 as represented by Y ideal values 684 are used to calculate the adjacent track interference metric 662, a convolution filter circuit 678 convolves the decoded output 656 with the partial response target 676 of the data channel to yield the Y ideal values 684. Convolution filter circuit 678 may be any circuit known in the art that is capable of applying target based filtering to an input signal to yield an output conformed to a target. Based upon the disclosure provided herein, one of ordinary skill in the art will recognize a variety of circuitry that may be included as part of convolution filter circuit 678 to generate Y ideal values 684. In some embodiments in which the true values of the equalized output 614 are represented by Y ideal values 684, the adjacent track interference metric calculator 686 calculates the difference between the equalized output 614 and the Y ideal values 684 on a bit by bit basis according to the following equation, yielding an error signal $Y_{err}[i]$, where index i is the bit index in the stream for a data sector:

$$Y_{err}[i] = Y[i] - Y_{ideal}[i],$$

where $Y[i]$ is the equalized Y sample bit at index i, and $Y_{ideal}[i]$ is the ideal or true value for the corresponding bit. Again, the $Y_{ideal}[i]$ value can be determined in any of a number of manners in various embodiments. In some embodiments, $Y_{ideal}[i]$ is calculated by convolving a detected value or hard decision, obtained from a data detector such as, but not limited to, a Viterbi detector, with a partial response target for the data channel, yielding Y ideal values 684. In some embodiments, $Y_{ideal}[i]$ is a detected value or hard decision in detected output 642 (not shown) or using decoded output 656 (as is shown). In some cases, Y ideal value 684 input to adjacent track interference metric calculator 686 can be omitted.

Adjacent track interference metric 662, also referred to herein as long magnet error sigma $Z_L$, is calculated in some embodiments as the standard deviation of the error signal $Y_{err}[i]$, considering only long magnet bits. In some embodiments, adjacent track interference metric calculator 686 calculates the error signal $Y_{err}[i]$ only for long magnets, based on a long magnet detected signal 690 generated by long magnet detector 688. In some other embodiments, adjacent track interference metric calculator 686 calculates error signal $Y_{err}[i]$ for all bits, then calculates adjacent track interference metric 662 for only long magnets. The long magnet detector 688 compares the current bit with the previous and subsequent bits to determine if they have the same value. For example, if the current bit is a 0, and the two previous bits and the two subsequent bits are also 0, the long magnet detector 688 asserts the long magnet detected signal 690. Long magnet detector circuit 688 may operate on any bit input to adjacent track interference metric calculator 686 to determine whether the current bit being processed by adjacent track interference metric calculator 686 is a long magnet, such as, but not limited to, the detected output 642 (not shown) or equalized output 614 (as is shown). Long magnet detector circuit 688 may be any circuit for identifying a long magnet. Based upon the disclosure provided herein, one of ordinary skill in the art will recognize a variety of circuitry that may be included as part of long magnet detector 688.

Adjacent track interference metric 662 or long magnet error sigma $Z_L$ is computed in some embodiments in adjacent track interference metric calculator 686 as the standard deviation of the error signal by the mean and mean square of the error signal according to the following equation:

$$Z_L = (E_{i\in\psi}[Y_{err}[i]^2] - E_{i\in\psi}^2[Y_{err}[i]])^{1/2},$$

where $Y_{err}[i]$ is the error signal corresponding to a non-return to zero value a[i] of bit i. Adjacent track interference metric calculator 686 may be any circuit for calculating adjacent track interference metric 662 as disclosed herein. Based upon the disclosure provided herein, one of ordinary skill in the art will recognize a variety of circuitry that may be included as part of adjacent track interference metric calculator 686. As just some examples, U.S. patent application Ser. No. 13/963,589 entitled "Data Processing System With Adjacent Track Interference Metric", and filed Aug. 9, 2013 by Hwang et al. The entirety of the aforementioned application is incorporated herein by reference for all purposes. A metric comparator circuit 664 compares adjacent track interference metric 662 with threshold 636 from threshold calibration circuit 638. If adjacent track interference metric 662 exceeds threshold 636, a possible adjacent track interference is indicated by asserting an interference signal 669. Of note, where the two read heads from which analog input 602 and analog input 692 offer a significantly different response separate threshold calibration circuits 638 may be used for each of metric comparator calculation circuit 634 and metric comparator calculation circuit 664.

A position error estimate ("PEE") circuit 693 receives both digital samples 610 and digital samples 688, and calculates a position error for each of the first read head (from which digital samples 610 are derived) and the second read head (from which digital samples 688 are derived). In some embodiments of the present invention, position error estimate ("PEE") circuit 693 relies on either preamble or synchronization information in the respective data sets to calculate the position error. Based upon the disclosure provided herein, one of ordinary skill in the art will recognize a variety of circuits that may be used to calculate position error (i.e., distance from the center of the track). Position error estimate circuit 693 selects either the data from the first read head or the data from the second read head based upon which of the position errors is the smallest. Thus, for example where digital samples 610 exhibits a smaller position error magnitude that digital samples 688, position error estimate circuit 693 provides a selector output and error value 697 indicating that interference signal 640 is to be used and providing the corresponding position error magnitude. Alternatively, where digital samples 688 exhibits a smaller position error magnitude that digital samples 610, position error estimate circuit 693 provides a selector output and error value 697 indicating that interference signal 669 is to be used and providing the corresponding position error magnitude.

Selector output and error value 697 is provided to adjacent track interference confirmation circuit 680 along with interference signal 669 and adjacent track interference metric 662, and interference signal 640 and adjacent track interference metric 632. Adjacent track interference confirmation circuit 680 selects one of the combination of interference signal 640 and adjacent track interference metric 632 or the combination of interference signal 669 and adjacent track interference metric 662 based upon selector output and error magnitude 697. Using the selected combination, adjacent track interference confirmation circuit 680 operates to determine whether the identified possible adjacent track interference (as indicated by the selected one of interference signal 640 or interference signal 669) is due to improper positioning of the head relative to the target track (i.e., track mis-registration) which would have the affect of increasing the appearance of adjacent track interference as the head would be located closer to the adjacent track, of whether the identified possible adjacent track interference reflects degradation in the target track due to writing and re-writing the adjacent track(s). Where it is determined that the selected one of possible adjacent track interference is asserted due to track mis-registration, a re-write of the track is not initiated, but rather a mis-registered signal 686 is asserted by adjacent track interference confirmation circuit 680.

Alternatively, where it is determined that the selected one of possible adjacent track interference is not asserted due to track mis-registration, a re-write of the track is initiated by asserting a re-write signal 684. When re-write signal 684 is asserted, the currently processing sector is refreshed in any suitable manner by the storage device. In some embodiments, the storage device controller reads the sector and rewrites the sector in place.

Threshold 636 may be generated similar to the threshold generation discussed in U.S. patent application Ser. No. 13/963,589 entitled "Data Processing System With Adjacent Track Interference Metric", and filed Aug. 9, 2013 by Hwang et al. The entirety of the aforementioned application was previously incorporated herein by reference for all purposes.

In some embodiments of the present invention, adjacent track interference confirmation circuit 680 determines whether the selected one of possible adjacent track interference metrics 640, 669 was asserted due to track mis-registration or whether it was asserted due to adjacent track interference which can be mitigated by re-writing the data. In particular, where the selected one of interference signal 640 or interference signal 669 is asserted adjacent track interference confirmation circuit 680 compares the magnitude of the position error estimate corresponding to the selected read head that is received as selector output and error value 697 with a threshold value. Where the position error estimate is less than the threshold value, it is assumed that the relatively high adjacent track interference is not due to track mis-registration. In such a case, adjacent track interference confirmation circuit 680 asserts a re-write output 684 that causes the currently processing sector to be re-written to the track.

Alternatively, where the position error estimate is greater than the threshold value, it is assumed that the relatively high adjacent track interference may be due to track mis-registration. In such a case, adjacent track interference confirmation circuit 680 causes a re-read of the currently processing sector using the selected read head from the track on the storage medium, but at a modified offset from the center of the track. The modified offset is adjusted to account for the position error value received as selector output and error value 697. The modified offset may be calculated in accordance with the following equation:

$$\text{Modified Offset} = \text{Defined Offset} - PEE,$$

where PEE is the earlier calculated position error estimate for the read head form which the re-read data is being derived. The adjacent track interference metric is calculated for the selected read head (i.e., one of adjacent track interference metric 632 or adjacent track interference metric 662), and the newly calculated adjacent track interference metric is compared with the threshold value (i.e., either threshold value 636 or threshold value 666) corresponding to the selected read head. Where the newly calculated adjacent track interference metric is greater than the threshold value, it is assumed that the relatively high adjacent track interference is not due to track mis-registration. In such a case, adjacent track interference confirmation circuit 680 asserts a re-write output 684 that causes the currently processing sector to be re-written to the track. Alternatively, where the newly calculated adjacent track interference metric is less than the threshold value, it is assumed that the prior relatively high value of inter-track interference was dues to track mis-registration and no re-write is performed, rather a mis-registration output 686 is asserted.

The following pseudo-code shows one example operation of adjacent track interference confirmation circuit 680:

```
If (PEE for the First Read Head < PEE for the Second Read Head){
    If(interference signal 640 is asserted){
        If(|PEE for the First Read Head| < Threshold){/* smaller track mis-registration*/
            cause re-write of the currently processing sector by asserting re-write signal 684;
    }
```

-continued

```
    Else{
        Modified Offset = Defined Offset - PEE for the First Read Head ;
        re-read the currently processing sector using the modified offset;
        re-calculate adjacent track interference metric 640 using the newly read data
from the First Read Head to yield an updated metric;
        If(updated metric > Threshold 636){ /* smaller track mis-registration confirmed*/
            cause re-write of the currently processing sector by asserting re-write signal 684;
        }
        Else { /* larger track mis-registration confirmed*/
            assert mis-registration signal 686;
        }
    }
}
Else If (PEE for the Second Read Head < PEE for the First Read Head){
    If(interference signal 669 is asserted){
        If(|PEE for the Second Read Head| < Threshold){/* smaller track mis-registration*/
        cause re-write of the currently processing sector by asserting re-write signal 684;
    }
    Else{
        Modified Offset = Defined Offset - PEE for the Second Read Head ;
        re-read the currently processing sector using the modified offset;
        re-calculate adjacent track interference metric 6669 using the newly read data from the
Second Read Head to yield an updated metric;
        If(updated metric > Threshold 666){ /* smaller track mis-registration confirmed*/
            cause re-write of the currently processing sector by asserting re-write signal 684;
        }
        Else {/* larger track mis-registration confirmed*/
            assert mis-registration signal 686;
        }
    }
}
```

Figure 7:
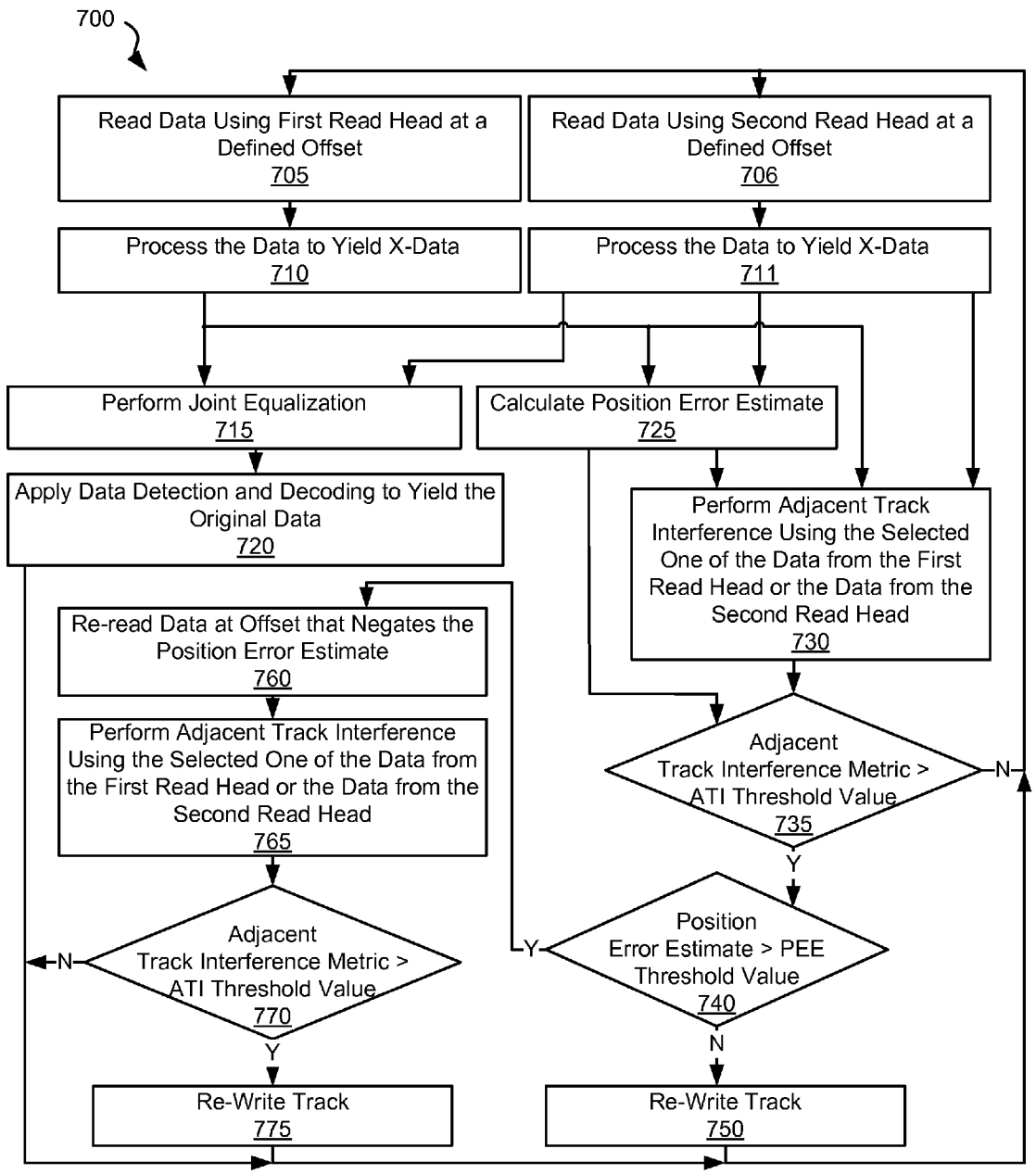
FIG. 7 is a flow diagram showing a method for X-based confirmation track re-write in accordance with various embodiments of the present invention.

Turning to FIG. 7, a flow diagram 700 shows a method for X-based confirmation track re-write in accordance with various embodiments of the present invention. Following flow diagram 700, data is accessed from a storage medium from a first read head at a defined offset from a center of the track (block 705) and from a second read head at the defined offset (block 706). In some cases, the defined offset is the expected center of the track and may be measured from one of the read heads or a fixed point on the head relative to both of the read heads. The data derived from the first read head is processed (block 710) in parallel to processing of the data from derived from the second read head (block 711). This processing may include, but is not limited to, converting the data from an analog signal to a series of corresponding digital samples to yield X-data.

A joint equalization is performed on a combination of the processed data from the first read head and the processed data from the second read head to yield an equalized output (block 715). Data detection and decoding algorithms are applied to the equalized output to yield the original data set (i.e., the data set prior to decoding) corresponding to the equalized output (block 720). In addition, a position error estimate is calculated for each of the processed data from the first read head and the processed data from the second read head (block 725). The respective position error outputs indicate a distance from the respective head to the center of the track. A position error estimate is calculated for each of the respective data sets using, for example, preamble or synchronization information in the respective data sets. Based upon the disclosure provided herein, one of ordinary skill in the art will recognize a variety of circuits that may be used to calculate position error (i.e., distance from the center of the track). The position error with the smallest magnitude (i.e., corresponding to the read head closest to the center of the track) is selected.

An adjacent track interference metric is calculated using the processed data derived from the read head exhibiting the smallest position error (block 730). The adjacent track interference metric may be calculated using any approach known in the art for calculating a value indicative of inter-track interference. As just some examples, the adjacent track interference metric may be calculated similar to that discussed in U.S. patent application Ser. No. 13/963,589 entitled "Data Processing System With Adjacent Track Interference Metric", and filed Aug. 9, 2013 by Hwang et al. The entirety of the aforementioned application was previously incorporated herein by reference for all purposes.

It is determined whether the adjacent track interference metric exceeds an adjacent track interference (ATI) threshold value (block 735). Where the adjacent track interference metric does not exceed the ATI threshold value (block 735), the amount of adjacent track interference is found to be sufficiently low that a re-write of the currently processing sector on the track is not warranted. In contrast, where the adjacent track interference metric exceeds the ATI threshold value (block 735), the amount of adjacent track interference is found to be sufficiently high that a re-write of the currently processing sector on the track would be warranted if the head is properly centered over the track being read (i.e., defined offset is close to the center of the track).

To determine whether the head is properly centered over the track being read, it is determined whether the magnitude of the position error estimate for the selected read head is greater than the ATI threshold value (block 735). Where the magnitude of the position error estimate does not exceed a position error estimate (PEE) threshold value (block 740), it is assumed that the indication of adjacent track interference indicated by the calculated adjacent track interference metric is not due to track mis-registration. In such a case, the currently processing sector in the track is re-written to mitigate the effects of adjacent track interference (block 750).

Alternatively, where the magnitude of the position error estimate exceeds the PEE threshold value (block 740), it is possible that the indication of adjacent track interference indicated by the calculated adjacent track interference metric is due to track mis-registration. In such a case, data is re-read by the selected read head at a modified offset that is modified to counteract the position error estimate (block 760). The modified offset may be calculated in accordance with the following equation:

Modified Offset=Defined Offset−PEE, where PEE is the earlier calculated position error estimate for the read head form which the re-read data is being derived. The re-read data from the same track at the modified offset is processed using the same processing discussed above in relation to blocks 705, 710 and 706, 711. The same adjacent track interference metric calculation done in block 730 is performed to yield an updated metric (block 765). It is then determined whether the newly calculated adjacent track interference metric is greater than the ATI threshold value (block 770). Where it is not greater than the ATI threshold value (block 770), it is assumed that the previous indication of adjacent track interference was substantially due to track mis-registration and the sector is not re-written. In contrast, where it is greater than the ATI threshold value (block 770), it is assumed sufficient adjacent track interference exists to warrant a re-writing of the sector of the track (block 775).

Figure 8:
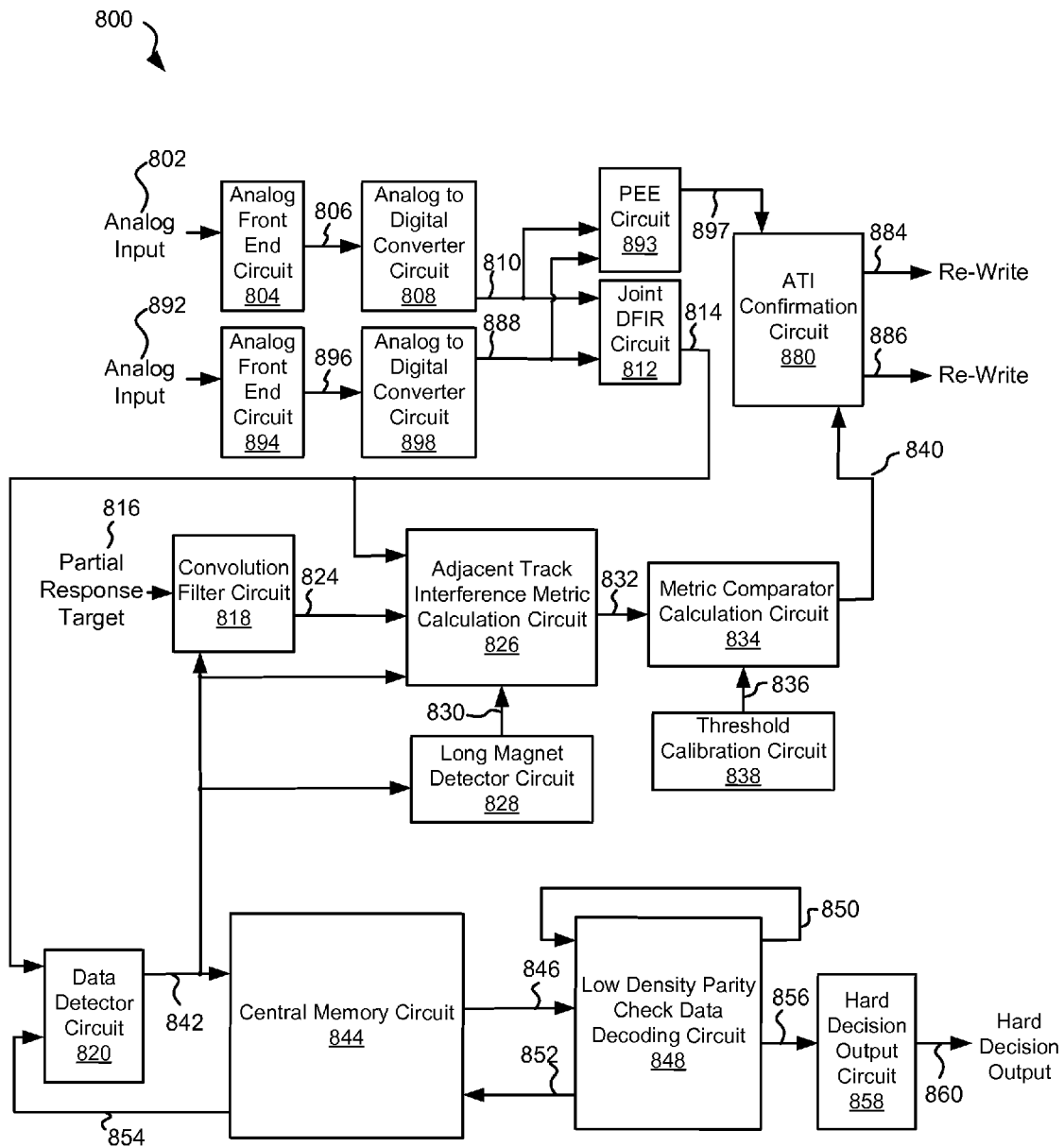
FIG. 8 shows a multi-head data processing circuit including Y-based adjacent track interference confirmation circuitry in accordance with various embodiments of the present invention.

Turning to FIG. 8, a multi-head data processing circuit 800 including a Y-based adjacent track interference confirmation circuit 880 operable to confirm an indication of sufficient adjacent track interference to cause a data re-write is shown in accordance with various embodiments of the present invention. Data processing circuit 800 includes an analog front end circuit 804 that receives an analog signal 802 derived from a first read head. Analog front end circuit 804 processes analog signal 802 and provides a processed analog signal 806 to an analog to digital converter circuit 808. Analog front end circuit 804 may include, but is not limited to, an analog filter and an amplifier circuit as are known in the art. Based upon the disclosure provided herein, one of ordinary skill in the art will recognize a variety of circuitry that may be included as part of analog front end circuit 808. In some cases, analog input signal 802 is derived from a read/write head assembly (not shown) that is disposed in relation to a storage medium (not shown). Based upon the disclosure provided herein, one of ordinary skill in the art will recognize a variety of sources from which analog signal 802 may be derived.

Analog to digital converter circuit 808 converts processed analog signal 806 into a corresponding series of digital samples 810 or X samples. Analog to digital converter circuit 808 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

Additionally, data processing circuit 800 includes an analog front end circuit 894 that receives an analog signal 892 derived from a second read head. Analog front end circuit 894 processes analog signal 892 and provides a processed analog signal 896 to an analog to digital converter circuit 898. Analog front end circuit 894 may include, but is not limited to, an analog filter and an amplifier circuit as are known in the art. Based upon the disclosure provided herein, one of ordinary skill in the art will recognize a variety of circuitry that may be included as part of analog front end circuit 898. In some cases, analog input signal 892 is derived from a read/write head assembly (not shown) that is disposed in relation to a storage medium (not shown). Based upon the disclosure provided herein, one of ordinary skill in the art will recognize a variety of sources from which analog signal 892 may be derived.

Analog to digital converter circuit 898 converts processed analog signal 896 into a corresponding series of digital samples 888 or X samples. Analog to digital converter circuit 898 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

A joint equalizer circuit 812 receives digital samples 810 and digital samples 888, and applies a joint equalization to yield a unified equalized output 814 or Y-samples. Joint equalizer circuit 812 may be any equalization circuit operable to equalize two or more input data sets to yield a unified equalized output. In some cases, joint equalizer circuit 812 includes sufficient memory to maintain one or more codewords until a data detector circuit 820 is available for processing, and for multiple passes through data detector circuit 820.

Data detector circuit 820 is a circuit capable of producing a detected output 842 by applying a data detection algorithm to a data input. In some embodiments, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. In some embodiments, data detector circuit 820 provides both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 842 is provided to a central queue memory circuit 844 that operates to buffer data passed between data detector circuit 820 and data decoder circuit 848. When data decoder circuit 848 is available, data decoder circuit 848 receives detected output 842 from central queue memory 844 as a decoder input 846. Data decoder circuit 820 applies a data decoding algorithm to decoder input 846 in an attempt to recover originally written data. The result of the data decoding algorithm is provided as a decoded output 852. Similar to detected output 842, decoded output 852 includes both hard decisions and soft decisions in some embodiments. Data decoder circuit 848 may be any data decoder circuit known in the art that is capable of applying a decoding algorithm to a received input. Data decoder circuit 848 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 848 provides the result of the data decoding algorithm as a decoded output 856. Decoded output 856 is provided to a hard decision output circuit 858 where the data is reordered before providing a series of ordered data sets as a data output 860.

One or more iterations through the combination of data detector circuit 820 and data decoder circuit 848 may be made in an effort to converge on the originally written data set. For the first global iteration, data detector circuit 820 applies the data detection algorithm without guidance from a decoded output. For subsequent global iterations, data detector circuit 820 applies the data detection algorithm to buffered equalized output 814 as guided by decoded output 852. Decoded output 852 is received from central queue memory 844 as a detector input 854.

During each global iteration it is possible for data decoder circuit 848 to make one or more local iterations including application of the data decoding algorithm to decoder input 846. For the first local iteration, data decoder circuit 848 applies the data decoder algorithm without guidance from a decoded output 850. For subsequent local iterations, data decoder circuit 848 applies the data decoding algorithm to decoder input 846 as guided by a previous decoded output 850.

As part of a read operation, an adjacent track interference metric calculator 826 calculates an adjacent track interference metric 832 based upon equalized output 814 to determine whether the current sector from a target track as sensed by read heads has been degraded by write operations to adjacent tracks. Again, sectors are degraded when their side tracks are written many times. The adjacent track interference metric estimates the degradation from the readback signal, based on a comparison of the equalized output 814 and the true values of the equalized output 814 as represented by detected output 842 using either or both soft decisions and hard decisions. The resulting adjacent track interference metric 832 can be used for making decisions to rewrite the degraded sectors.

In some embodiments in which the true values of the equalized output 814 as represented by Y ideal values 824 are used to calculate the adjacent track interference metric 832, a convolution filter circuit 818 convolves the detected output 842 with the partial response target 816 of the data channel to yield the Y ideal values 824. Convolution filter circuit 818 may be any circuit known in the art that is capable of applying target based filtering to an input signal to yield an output conformed to a target. Based upon the disclosure provided herein, one of ordinary skill in the art will recognize a variety of circuitry that may be included as part of convolution filter circuit 818 to generate Y ideal values 824. In some embodiments in which the true values of the equalized output 814 are represented by Y ideal values 824, the adjacent track interference metric calculator 826 calculates the difference between the equalized output 814 and the Y ideal values 824 on a bit by bit basis according to the following equation, yielding an error signal $Y_{err}[i]$, where index i is the bit index in the stream for a data sector:

$$Y_{err}[i]=Y[i]-Y_{ideal}[i],$$

where y[I] is the equalized Y sample bit at index i, and $Y_{ideal}[i]$ is the ideal or true value for the corresponding bit. Again, the $Y_{ideal}[i]$ value can be determined in any of a number of manners in various embodiments. In some embodiments, $Y_{ideal}[i]$ is calculated by convolving a detected value or hard decision, obtained from a data detector such as, but not limited to, a Viterbi detector, with a partial response target for the data channel, yielding Y ideal values 824. In some embodiments, $Y_{ideal}[i]$ is a detected value or hard decision in detected output 842 (as is shown) or using decoded output 856 (not shown). In some cases, Y ideal value 824 input to adjacent track interference metric calculator 826 can be omitted.

Adjacent track interference metric 832, also referred to herein as long magnet error sigma $Z_L$, is calculated in some embodiments as the standard deviation of the error signal $Y_{err}[i]$, considering only long magnet bits. In some embodiments, adjacent track interference metric calculator 826 calculates the error signal $Y_{err}[i]$ only for long magnets, based on a long magnet detected signal 830 generated by long magnet detector 828. In some other embodiments, adjacent track interference metric calculator 826 calculates error signal $Y_{err}[i]$ for all bits, then calculates adjacent track interference metric 832 for only long magnets. The long magnet detector 828 compares the current bit with the previous and subsequent bits to determine if they have the same value. For example, if the current bit is a 0, and the two previous bits and the two subsequent bits are also 0, the long magnet detector 828 asserts the long magnet detected signal 830. Long magnet detector circuit 828 may operate on any bit input to adjacent track interference metric calculator 826 to determine whether the current bit being processed by adjacent track interference metric calculator 826 is a long magnet, such as, but not limited to, the detected output 842 (not shown) or equalized output 814 (as is shown). Long magnet detector circuit 828 may be any circuit for identifying a long magnet. Based upon the disclosure provided herein, one of ordinary skill in the art will recognize a variety of circuitry that may be included as part of long magnet detector circuit 828.

Adjacent track interference metric 832 or long magnet error sigma $Z_L$ is computed in some embodiments in adjacent track interference metric calculator 826 as the standard deviation of the error signal by the mean and mean square of the error signal according to the following equation:

$$Z_L=(E_{i\in\psi}[Y_{err}[i]^2]-E_{i\in\psi}^2[Y_{err}[i]])^{1/2},$$

where $Y_{err}[i]$ is the error signal corresponding to a non-return to zero value a[i] of bit i. Adjacent track interference metric calculator 826 may be any circuit for calculating adjacent track interference metric 832 as disclosed herein. Based upon the disclosure provided herein, one of ordinary skill in the art will recognize a variety of circuitry that may be included as part of adjacent track interference metric calculator 826. As just some examples, U.S. patent application Ser. No. 13/963, 589 entitled "Data Processing System With Adjacent Track Interference Metric", and filed Aug. 9, 2013 by Hwang et al. The entirety of the aforementioned application is incorporated herein by reference for all purposes. A metric comparator circuit 834 compares adjacent track interference metric 832 with a threshold 836. If adjacent track interference metric 832 exceeds threshold 836, a possible adjacent track interference is indicated by asserting an interference signal 840. Threshold 836 and threshold 866 may be generated similar to the threshold generation discussed in U.S. patent application Ser. No. 13/963,589 entitled "Data Processing System With Adjacent Track Interference Metric", and filed Aug. 9, 2013 by Hwang et al. The entirety of the aforementioned application was previously incorporated herein by reference for all purposes.

A position error estimate ("PEE") circuit 893 receives both digital samples 810 and digital samples 888, and calculates a position error for each of the first read head (from which digital samples 810 are derived) and the second read head (from which digital samples 888 are derived). In some embodiments of the present invention, position error estimate ("PEE") circuit 893 relies on either preamble or synchronization information in the respective data sets to calculate the position error. Based upon the disclosure provided herein, one of ordinary skill in the art will recognize a variety of circuits that may be used to calculate position error (i.e., distance from the center of the track). Position error estimate circuit 893 unifies the position error estimates for each of the respective heads and provides a unified position error estimate 897 that corresponds to a balance between the use of digital samples 810 and digital samples 888 in equalized output 814.

Unified position error estimate 897 is provided to adjacent track interference confirmation circuit 880. Adjacent track interference confirmation circuit 880 compares unified position error estimate 897 with a threshold value. Where unified position error estimate 897 is less than the threshold value, it is assumed that the relatively high adjacent track interference is not due to track mis-registration. In such a case, adjacent track interference confirmation circuit 880 asserts a re-write output 884 that causes the currently processing sector to be re-written to the track.

Alternatively, where unified position error estimate 897 is greater than the threshold value, it is assumed that the relatively high adjacent track interference may be due to track mis-registration. In such a case, adjacent track interference confirmation circuit 880 causes a re-read of the currently processing sector using the selected read head from the track on the storage medium, but at a modified offset from the center of the track. The modified offset is adjusted to account for the position error value received as selector output and error value 897. The modified offset may be calculated in accordance with the following equation:

Modified Offset=Defined Offset−PEE, where PEE is the earlier calculated position error estimate for the read head form which the re-read data is being derived. The adjacent track interference metric is calculated for the selected read head (i.e., one of adjacent track interference metric 832 or adjacent track interference metric 862), and the newly calculated adjacent track interference metric is compared with the threshold value (i.e., either threshold value 836 or threshold value 866) corresponding to the selected read head. Where the newly calculated adjacent track interference metric is greater than the threshold value, it is assumed that the relatively high adjacent track interference is not due to track mis-registration. In such a case, adjacent track interference confirmation circuit 880 asserts a re-write output 884 that causes the currently processing sector to be re-written to the track. Alternatively, where the newly calculated adjacent track interference metric is less than the threshold value, it is assumed that the prior relatively high value of inter-track interference was dues to track mis-registration and no re-write is performed, rather a mis-registration output 886 is asserted.

The following pseudo-code shows one example operation of adjacent track interference confirmation circuit 880:

```
If (PEE for the First Read Head < PEE for the Second Read Head){
    If(interference signal 840 is asserted){
        If(|PEE for the First Read Head| < Threshold) {/* smaller track mis-registration*/
            cause re-write of the currently processing sector by asserting re-write signal 884;
        }
        Else{
            Modified Offset = Defined Offset - PEE for the First Read Head;
            re-read the currently processing sector using the modified offset;
            re-calculate adjacent track interference metric 840 using the newly read data from the
First Read Head to yield an updated metric;
            If(updated metric > Threshold 836){ /* smaller track mis-registration confirmed*/
                cause re-write of the currently processing sector by asserting re-write signal 884;
            }
            Else {/* larger track mis-registration confirmed*/
                assert mis-registration signal 886;
            }
        }
    }
}
Else If (PEE for the Second Read Head < PEE for the First Read Head){
    If(interference signal 869 is asserted){
        If(|PEE for the Second Read Head| < Threshold) {/* smaller track mis-registration*/
            cause re-write of the currently processing sector by asserting re-write signal 884;
        }
        Else {
            Modified Offset = Defined Offset - PEE for the Second Read Head;
            re-read the currently processing sector using the modified offset;
            re-calculate adjacent track interference metric 8669 using the newly read data from the
Second Read Head to yield an updated metric;
            If(updated metric > Threshold 866){ /* smaller track mis-registration confirmed*/
                cause re-write of the currently processing sector by asserting re-write signal 884;
            }
            Else { /* larger track mis-registration confirmed*/
                assert mis-registration signal 886;
            }
        }
    }
}
```

Figure 9:
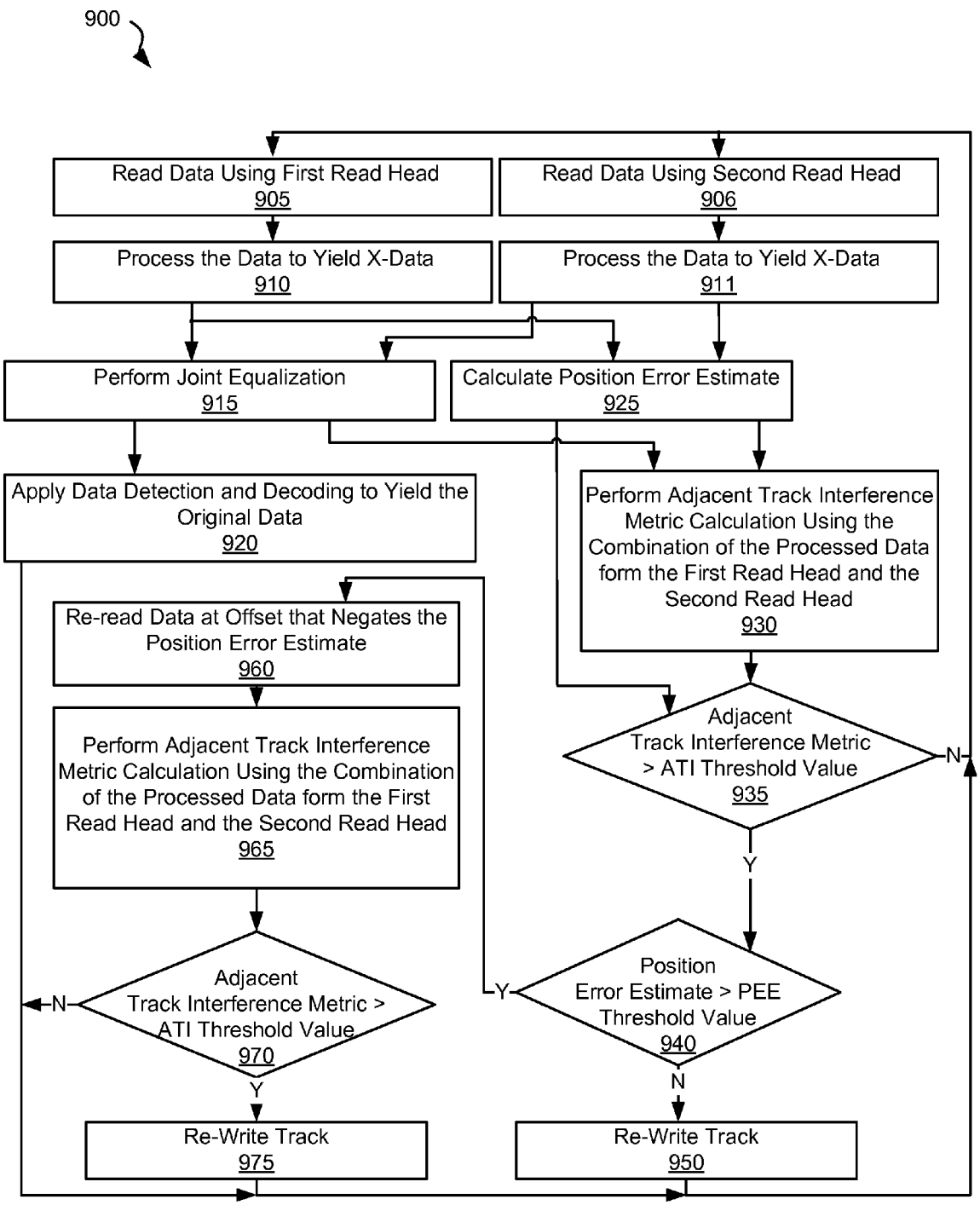
FIG. 9 is a flow diagram showing a method for Y-based confirmation track re-write in accordance with various embodiments of the present invention.

Turning to FIG. 9, a flow diagram 900 shows a method for Y-based confirmation track re-write in accordance with various embodiments of the present invention. Following flow diagram 900, data is accessed from a storage medium from a first read head at a defined offset from a center of the track (block 905) and from a second read head at the defined offset (block 906). In some cases, the defined offset is the expected center of the track and may be measured from one of the read heads or a fixed point on the head relative to both of the read heads. The data derived from the first read head is processed (block 910) in parallel to processing of the data from derived from the second read head (block 911). This processing may include, but is not limited to, converting the data from an analog signal to a series of corresponding digital samples to yield X-data.

A joint equalization is performed on a combination of the processed data from the first read head and the processed data from the second read head to yield an equalized output (block 915). Data detection and decoding algorithms are applied to the equalized output to yield the original data set (i.e., the data set prior to decoding) corresponding to the equalized output (block 920). In addition, a position error estimate is calculated for each of the processed data from the first read head and the processed data from the second read head (block 925). The respective position error outputs indicate a distance from the respective head to the center of the track. A position error estimate is calculated for each of the respective data sets using, for example, preamble or synchronization information in the respective data sets. Based upon the disclosure provided herein, one of ordinary skill in the art will recognize a variety of circuits that may be used to calculate position error (i.e., distance from the center of the track). The position error with the smallest magnitude (i.e., corresponding to the read head closest to the center of the track) is selected.

An adjacent track interference metric is calculated using the equalized output generated from data derived from both of the read heads (block 930). The adjacent track interference metric may be calculated using any approach known in the art for calculating a value indicative of inter-track interference. As just some examples, the adjacent track interference metric may be calculated similar to that discussed in U.S. patent application Ser. No. 13/963,589 entitled "Data Processing System With Adjacent Track Interference Metric", and filed Aug. 9, 2013 by Hwang et al. The entirety of the aforementioned application was previously incorporated herein by reference for all purposes.

It is determined whether the adjacent track interference metric exceeds an adjacent track interference (ATI) threshold value (block 935). Where the adjacent track interference metric does not exceed the ATI threshold value (block 935), the amount of adjacent track interference is found to be sufficiently low that a re-write of the currently processing sector on the track is not warranted. In contrast, where the adjacent track interference metric exceeds the ATI threshold value (block 935), the amount of adjacent track interference is found to be sufficiently high that a re-write of the currently processing sector on the track would be warranted if the head is properly centered over the track being read (i.e., defined offset is close to the center of the track).

To determine whether the head is properly centered over the track being read, it is determined whether the magnitude of the position error estimate for the selected read head is greater than a position error estimate (PEE) threshold value (block 940). Where the magnitude of the position error estimate does not exceed the PEE threshold value (block 940), it is assumed that the indication of adjacent track interference indicated by the calculated adjacent track interference metric is not due to track mis-registration. In such a case, the currently processing sector in the track is re-written to mitigate the effects of adjacent track interference (block 950).

Alternatively, where the magnitude of the position error estimate exceeds the PEE threshold value (block 940), it is possible that the indication of adjacent track interference indicated by the calculated adjacent track interference metric is due to track mis-registration. In such a case, data is re-read by the selected read head at a modified offset that is modified to counteract the position error estimate (block 960). The modified offset may be calculated in accordance with the following equation:

Modified Offset=Defined Offset−PEE, where PEE is the earlier calculated position error estimate for the read head form which the re-read data is being derived. The re-read data from the same track at the modified offset is processed using the same processing discussed above in relation to blocks 905, 910 and 906, 911. The same adjacent track interference metric calculation done in block 930 is performed to yield an updated metric (block 965). It is then determined whether the newly calculated adjacent track interference metric is greater than the ATI threshold value (block 970). Where it is not greater than the ATI threshold value (block 970), it is assumed that the previous indication of adjacent track interference was substantially due to track mis-registration and the sector is not re-written. In contrast, where it is greater than the ATI threshold value (block 970), it is assumed sufficient adjacent track interference exists to warrant a re-writing of the sector of the track (block 975).

In some embodiments a calibration approach may be applied where an array of adjacent track interference metrics are calculated for a number of offset positions. In one particular embodiment of the present invention an array of seven values for adjacent track interference metrics ("ATIM") corresponding to different offsets (0.XTP) from a defined offset ("DO") is generated during a calibration period. The array is as follows:

$$\{ATIM_{DO-0.3TP}, ATIM_{DO-0.2TP}, ATIM_{DO-0.1TP}, ATIM_{DO}, ATIM_{DO+0.1TP}, ATIM_{DO+0.2TP}, ATIM_{DO+0.3TP}\}.$$

During processing a position error estimate is calculated as discussed above that indicates an offset. A value is accessed from the aforementioned array that corresponds to the position error estimate, and a comparison between a newly calculated adjacent track interference metric and the corresponding value from the array is performed. Where the newly calculated value substantially exceeds the value accessed from the array, a re-write is triggered. Such an approach does not require multiple re-reads, and yet provides a reasonable confirmation based upon a calculated position error estimate.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
an adjacent track interference confirmation circuit operable to:

receive an indication of an adjacent track interference;
determine a causal connection between the adjacent track interference and a mis-alignment of a read head and a track on a storage medium from which a data set corresponding to the indication of the adjacent track interference is derived; and
provide a re-write signal where even after reduction of the mis-alignment of the read head and the track, the indication of the adjacent track interference repeats.

2. The data processing system of claim 1, wherein the re-write signal is operable to trigger a magnetic storage device to refresh data on the track from which the data set is derived.

3. The data processing system of claim 1, wherein the data processing system further comprises:
an adjacent track interference indication circuit operable to provide the indication of an adjacent track interference, wherein the adjacent track interference indication circuit includes:
a long magnet identification circuit operable to identify long magnet bits in the data set, the long magnet bits comprising bits having a same value as a number of preceding and subsequent bits;
an error calculation circuit operable to subtract an ideal version of the long magnet bits from the long magnet bits to yield an error signal;
an adjacent track interference metric calculation circuit operable to calculate an adjacent track interference metric based on the error signal; and
a comparator circuit operable to compare the adjacent track interference metric with a threshold value and to provide the indication of the adjacent track interference when the adjacent track interference metric is greater than the threshold value.

4. The data processing system of claim 1, wherein the indication of the adjacent track interference is a first indication of the adjacent track interference, wherein the data set is an original data set, and wherein determining the causal connection comprises:
modifying an offset of the read head relative to the center of the track to yield a modified offset;
re-reading the data set from the track using the modified offset to yield an updated data set; and
generating a second indication of the adjacent track interference based upon the updated data set.

5. The data processing system of claim 4, wherein the indication of adjacent track interference repeats when the second indication of the adjacent track interference based upon the updated data set is generated.

6. The data processing system of claim 4, wherein the data processing system further comprises:
an adjacent track interference indication circuit operable to provide the first indication of an adjacent track interference and the second indication of the adjacent track interference, wherein the adjacent track interference indication circuit includes:
a long magnet identification circuit operable to identify a first set of long magnet bits in the original data set and a second set of long magnet bits in the updated data set;
an error calculation circuit operable to subtract an ideal version of the first set of long magnet bits from the first set of long magnet bits to yield a first error signal, and to subtract an ideal version of the second set of long magnet bits from the second set of long magnet bits to yield a second error signal;
an adjacent track interference metric calculation circuit operable to calculate a first adjacent track interference metric based on the first error signal and a second adjacent track metric based on the second error signal; and
a comparator circuit operable to compare the first adjacent track interference metric with a threshold value and to provide the first indication of the adjacent track interference when the first adjacent track interference metric is greater than the threshold value, and compare the second adjacent track interference metric with the threshold value and to provide the second indication of the adjacent track interference when the second adjacent track interference metric is greater than the threshold value.

7. The data processing system of claim 1, wherein the data processing system is implemented as part of an integrated circuit.

8. The data processing system of claim 1, wherein the data processing system is implemented as part of a storage device, and wherein the storage device further includes:
the storage medium; and
a read/write head assembly disposed in relation to the storage medium, wherein the read/write head assembly includes the read head.

9. A data processing system, the system comprising:
a position error calculation circuit operable to calculate a distance from a read head to the center of a track fro which a data set is derived;
an adjacent track interference confirmation circuit operable to:
receive an indication of an adjacent track interference;
compare the distance from the position error calculation circuit with a threshold value; and
provide a re-write signal where the distance from the position error calculation circuit is less than the threshold value.

10. The data processing system of claim 9, wherein the indication of the adjacent track interference is a first indication of the adjacent track interference, wherein the data set is an original data set, and wherein the adjacent track interference confirmation circuit is further operable to:
modify an offset of the read head relative to the center of the track to yield a modified offset;
re-read the data set from the track using the modified offset to yield an updated data set; and
generate a second indication of the adjacent track interference based upon the updated data set.

11. The data processing system of claim 10, wherein the adjacent track interference confirmation circuit is further operable to:
provide a re-write signal where the distance from the position error calculation circuit is greater than the threshold value upon reception of the second indication of the adjacent track interference.

12. The data processing system of claim 10, wherein modifying the offset of the read head relative to the center of the track to yield the modified offset includes:
subtracting the distance from the position error calculation circuit from a prior offset used to derive the original data set.

13. The data processing system of claim 9, wherein the data processing system is implemented as part of an integrated circuit.

14. The data processing system of claim 9, wherein the data processing system is implemented as part of a storage device, and wherein the storage device further includes:

the storage medium; and a read/write head assembly disposed in relation to the storage medium, wherein the read/write head assembly includes the read head.

15. The data processing system of claim 9, wherein the data processing system further comprises:

an adjacent track interference indication circuit operable to provide the indication of an adjacent track interference, wherein the adjacent track interference indication circuit includes:

a long magnet identification circuit operable to identify long magnet bits in the data set, the long magnet bits comprising bits having a same value as a number of preceding and subsequent bits;

an error calculation circuit operable to subtract an ideal version of the long magnet bits from the long magnet bits to yield an error signal;

an adjacent track interference metric calculation circuit operable to calculate an adjacent track interference metric based on the error signal; and a comparator circuit operable to compare the adjacent track interference metric with a threshold value and to provide the indication of the adjacent track interference when the adjacent track interference metric is greater than the threshold value.

16. A method for confirming data validity on a storage device, the method comprising:

providing a read head disposed in relation to a track on a storage device;

using a position error calculation circuit to calculate a distance from a read head to the center of a track from which a data set is derived;

receiving an indication of an adjacent track interference based upon a data set derived form the track;

comparing the distance from the position error calculation circuit with a threshold value; and re-writing the data set to the storage medium where the distance from the position error calculation circuit is less than the threshold value.

17. The method for claim 16, wherein the indication of the adjacent track interference is a first indication of the adjacent track interference, wherein the data set is an original data set, and wherein the method further comprises:

modifying an offset of the read head relative to the center of the track to yield a modified offset;

re-reading the data set from the track using the modified offset to yield an updated data set; and generating a second indication of the adjacent track interference based upon the updated data set.

18. The method for claim 17, wherein the method further comprises:

re-writing the original data set to the storage medium where the distance from the position error calculation circuit is less than the threshold value upon reception of the second indication of the adjacent track interference.

19. The method of claim 17, wherein modifying the offset of the read head relative to the center of the track to yield the modified offset includes:

subtracting the distance from the position error calculation circuit from a prior offset used to derive the original data set.

20. The method of claim 16, the method further comprising:

using a long magnet identification circuit operable to identify long magnet bits in the data set, the long magnet bits comprising bits having a same value as a number of preceding and subsequent bits;

using an error calculation circuit operable to subtract an ideal version of the long magnet bits from the long magnet bits to yield an error signal;

using an adjacent track interference metric calculation circuit operable to calculate an adjacent track interference metric based on the error signal; and using a comparator circuit operable to compare the adjacent track interference metric with a threshold value and to provide the indication of the adjacent track interference when the adjacent track interference metric is greater than the threshold value.

* * * * *